(12) United States Patent
Hosaka et al.

(10) Patent No.: US 6,775,391 B2
(45) Date of Patent: *Aug. 10, 2004

(54) ASSOCIATED INFORMATION ADDING APPARATUS AND METHOD ASSOCIATED INFORMATION DETECTING APPARATUS AND METHOD AND ILLEGAL USE PREVENTING SYSTEM

(75) Inventors: Kazuhisa Hosaka, Tokyo (JP); Nobuyoshi Miyahara, Kanagawa (JP); Yoichi Yagasaki, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,444

(22) Filed: Nov. 17, 1999

(65) Prior Publication Data

US 2004/0005076 A1 Jan. 8, 2004

(30) Foreign Application Priority Data

Nov. 18, 1998 (JP) .......................................... 10-327911

(51) Int. Cl.$^7$ ................................................ G06K 9/00
(52) U.S. Cl. ...................................................... 382/100
(58) Field of Search ........................................ 382/100

(56) References Cited

U.S. PATENT DOCUMENTS

| | | | | |
|---|---|---|---|---|
| 5,915,027 A | * | 6/1999 | Cox et al. ..................... | 380/54 |
| 6,108,434 A | * | 8/2000 | Cox et al. .................... | 382/100 |
| 6,148,333 A | * | 11/2000 | Guedalia et al. ............ | 709/219 |
| 6,246,775 B1 | * | 6/2001 | Nakamura et al. .......... | 382/100 |
| 6,268,866 B1 | * | 7/2001 | Shibata ....................... | 345/582 |
| 6,334,187 B1 | * | 12/2001 | Kadono ....................... | 713/176 |
| 6,360,000 B1 | * | 3/2002 | Collier ....................... | 382/100 |
| 6,404,926 B1 | * | 6/2002 | Miyahara et al. ........... | 382/232 |
| 6,449,379 B1 | * | 9/2002 | Rhoads ....................... | 382/100 |
| 2002/0094082 A1 | * | 7/2002 | Jones et al. ................. | 380/219 |

FOREIGN PATENT DOCUMENTS

WO    WO 99/45705    * 10/1999    .......... H04N/5/913

* cited by examiner

*Primary Examiner*—Leo Boudreau
*Assistant Examiner*—Hussein Akhavannik
(74) *Attorney, Agent, or Firm*—Frommer Lawrence & Haug LLP; William S. Frommer; Darren M. Simon

(57) ABSTRACT

The invention relates to an associated information adding apparatus and method for adding information associated with image data as an electronic watermark to the image data, and an associated information detecting apparatus and method for detecting the associated information. Particularly, the apparatus includes a memory for storing a unit watermark, a unit watermark repeating section for repeatedly reading the unit watermark from the memory by using a surplus obtained by dividing a pixel position coordinate value of a pixel in a vertical direction and a horizontal direction of an image by a size of a vertical and horizontal repetitive unit of the unit watermark, and an adding section for adding the unit watermark read out from the unit watermark repeating section to information of the image so that the unit watermark is repeated vertically and horizontally on the image. By this, since it is sufficient if the memory stores only the unit watermark, there is an effect that the memory to be used may be small.

6 Claims, 29 Drawing Sheets

WATERMARK OF INPUT IMAGE

AR

WATERMARK OF INPUT IMAGE AFTER FOLDING ACCUMULATION

WATERMARK OF INPUT IMAGE

WATERMARK OF INPUT IMAGE AFTER FOLDING ACCUMULATION

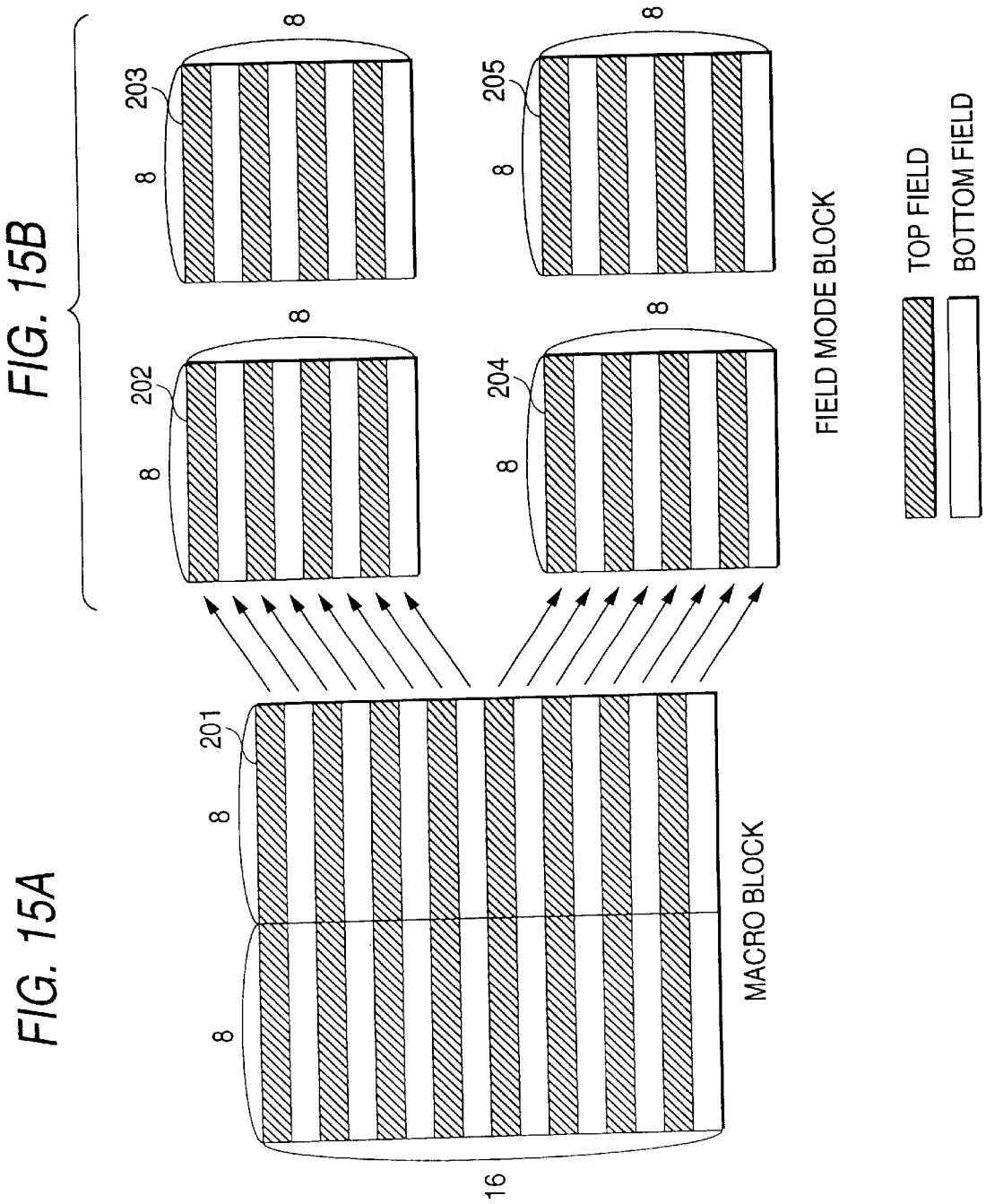

WATERMARK OF INPUT IMAGE

WATERMARK OF INPUT IMAGE
AFTER FOLDING ACCUMULATION
OF FRAME DCT COEFFICIENT

WATERMARK OF INPUT IMAGE
AFTER FOLDING ACCUMULATION
OF FIELD DCT COEFFICIENT

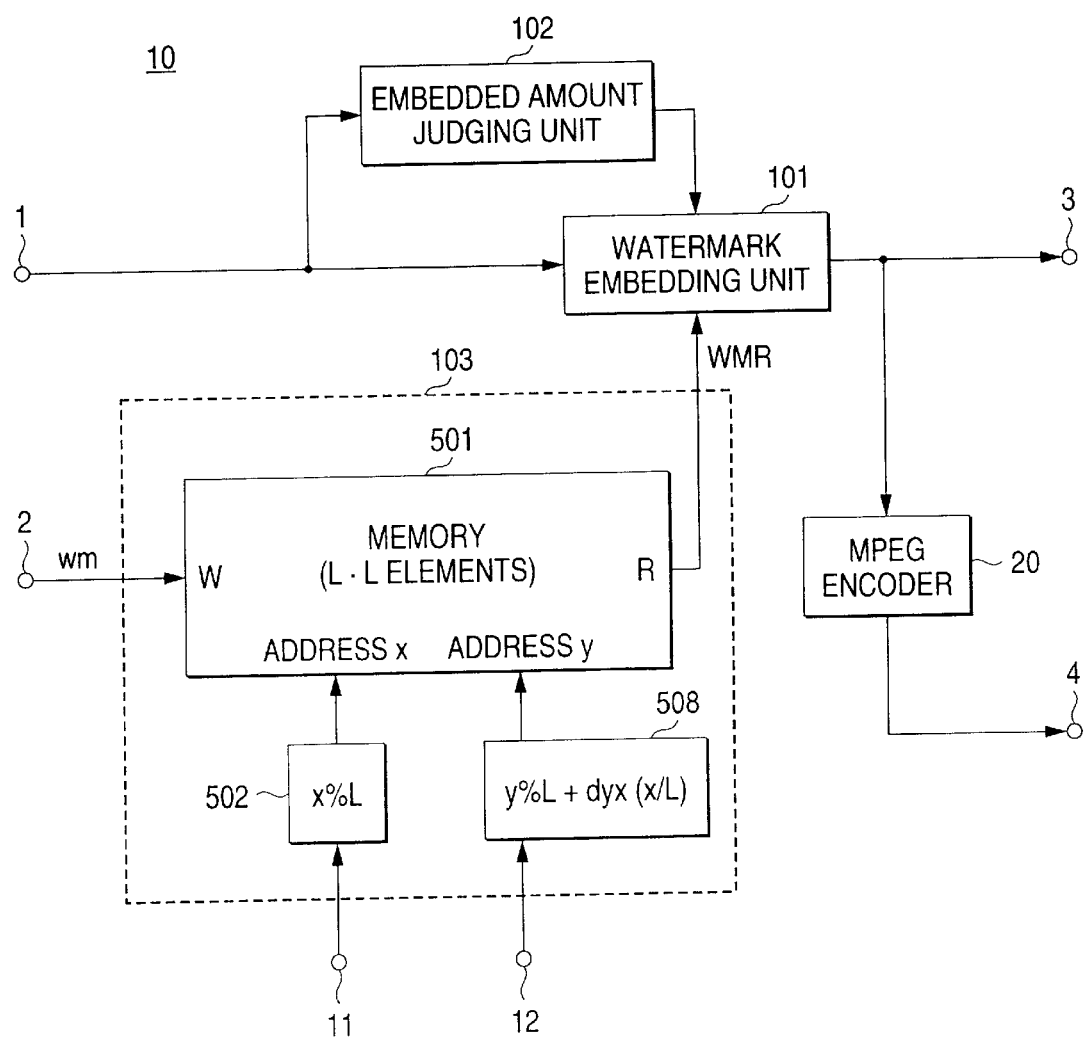

ASSOCIATED INFORMATION ADDING APPARATUS AND METHOD ASSOCIATED INFORMATION DETECTING APPARATUS AND METHOD AND ILLEGAL USE PREVENTING SYSTEM

BACKGROUND OF THE INVENTION

1. Field of the Invention

The present invention relates to an associated information adding apparatus and method for adding information associated with image data, such as a still image or a moving image sequence, as an electronic watermark (watermark) into the image data, and an associated information detecting apparatus and method for detecting the associated information. The invention also relates to an illegal use preventing system using the associated information adding apparatus or method and the associated information detecting apparatus or method.

2. Description of the Related Art

There is a technique in which information associated with arbitrary image data (still image or moving image sequence) is added to the image data, and the associated information is detected at the time of reproduction and is used. As a typical usage example of this technique, it is possible to make mention of addition of copyright information.

In the case where any unspecified user can use specific image data, it is conceivable that a person having copyright on the image adds copyright information previously into the image data in order to assert the right. By adding the copyright information, in the case where the copyright information to instruct a user that the image data are unable to be displayed is detected in the processing procedure of a reproducing apparatus or reproducing method of the image, it becomes possible to take such a countermeasure that the image data are not displayed.

At present, the foregoing addition or detection of copyright information is used in the illegal copying preventing function of a videotape of analog recording (a video signal is recorded in a state of an analog signal) and the like. This function makes it impossible to illegally copy a videotape obtained through a method such as borrowing from a rental agent, and the right of a person having the copyright of the videotape is protected.

In the case of a videotape of analog recording, since image data are recorded in an analog manner, the picture quality is deteriorated when copying is performed. On the contrary, in an apparatus for recording and reproducing image data in a digital manner, which has recently come into wide use, the picture quality is not deteriorated by copying in principle, and even a number of repetitions of copying can be made without deterioration of the picture quality. Thus, the damage by illegal copying with an apparatus for performing the processing in a digital manner becomes more serious than the case of an analog apparatus, and prevention of illegal copying in the apparatus for performing the processing in a digital manner becomes very important.

As methods of adding information associated with image data, such as the foregoing copyright information, into the image data, there are mainly two methods.

The first method is a method of adding information into an auxiliary portion of image data. The auxiliary portion of image data indicates a portion other than the image data in an effective screen region. For example, it is a vertical blanking period of an analog video signal, a header portion or an additional data portion of a digital video signal, or the like. Actually, in an analog videotape, auxiliary associated information of image data is added to a part of a vertical blanking period.

The second method is a method of adding information into a main portion of image data, that is, the image data in an effective screen region. In this method, some specific pattern is added to all or a part of an image to such a degree that it can not be visually sensed. This is called an electronic watermark processing. As a specific example of this, there is a spectrum diffusion or the like in which addition and detection of information is performed by employing a key pattern produced by using random numbers, M-sequence, etc.

Since the first method adds information into an auxiliary portion of image data, that is, a place different from the contents themselves of the image, there is a problem that if the auxiliary portion is once separated, the added information is lost.

On the contrary, the electronic watermark processing is a processing for embedding information as noise existing in image data and being an unimportant portion for the perception of a human being. The information embedded in the image data by such electronic watermark processing (hereinafter, the information embedded by means of electronic watermark is referred to as a "watermark") is added to the same frequency region and time region as the image data, so that it is hard to remove the information from the image data. On the other hand, there is a feature that even after filtering processing or data compression processing is performed for the image data, the watermark embedded in those can be detected from the image data.

The present application relates to an invention using a watermark as a method of adding associated information into a main portion of image data, which is the second method having the features as set forth above.

First, the outline of an adding and detecting system of a watermark will be described with reference to FIGS. 1 to 4.

FIG. 1 shows an example of a watermark pattern WM. The watermark pattern WM of this example has a size of vertical×horizontal=4n pixels×4n pixels (n is a natural number), and such a pattern that either one of two symbols +1 and −1 is taken for each pixel is designed to be used as shown in the drawing. In actual usage, it is preferable that the watermark pattern takes either one of the two symbols at random. The shape and size of a region of the watermark pattern are arbitrary.

When associated information is added to an image, a region having the same size as a region of a watermark pattern to be added is set on the image as an object for which the addition is performed. The set region and the watermark pattern WM are overlapped with each other to be checked, a value "a" is added for a pixel corresponding to the symbol of +1 in the watermark pattern WM, and a value "b" is subtracted for a pixel corresponding to the symbol of −1. Here, the value "a" and the value "b" can take arbitrary values.

FIG. 2 shows an example of addition of the watermark pattern WM into an image. In this example, every pixel value in a region of an image Pi as an object to which the addition is performed is 100, and a=1, b=−1 are set for the watermark pattern WM to be added. In an image Po obtained as a result that an embedding operation of this watermark pattern WM is performed, the pixel values are divided into 101 and 99 as shown in the drawing.

When associated information is detected, a region having the same size as the region of the watermark pattern WM is set on the image as an object to which detection is performed. An evaluation value as to correlation between the set image region and the watermark pattern WM is found. In this case, the sum for all pixels of the set image region is used as the evaluation value.

Specifically, when all pixels are summed to find the evaluation value, the set image region and the watermark pattern WM are overlapped with each other to be checked, addition is applied to the pixels of the symbol of +1 in the watermark pattern WM, and subtraction is applied to the pixels of the symbol of −1. At this time, detection is made by using the same pattern as the watermark pattern used when the associated information is added.

FIG. 3 is a view for explaining calculation of the evaluation value in the case where the watermark is detected from the image Po to which the watermark pattern WM was added in the manner as shown in FIG. 2. In this example of FIG. 3, the evaluation value becomes $(4n)^2$ (equal to the number of pixels contained in the region).

On the contrary, the image Po of FIG. 4 shows a case where the watermark pattern WM is not added, and the evaluation value of correlation to the watermark pattern with respect to this image Po becomes 0.

Actually, although it hardly occurs that all pixels of the image Pi as an object to which the watermark pattern is added have the same value, in the case where the region of the watermark pattern is sufficiently large and the watermark pattern is sufficiently random, from the horizontal and vertical correlation of an image, the evaluation value as to the image Po in the case where the watermark is not added becomes almost zero at all times. From this, in the case where the evaluation value exceeds a certain threshold value, it is permissible to judge that the associated information by the watermark is added to the image.

By the foregoing procedure, it becomes possible to add information (1 bit) of two values, as associated information, indicating whether the watermark is added or not. In the case where it is desired to add more information (plural bits), by such a processing method that the whole image is divided into k pieces of regions in space, in time, or in space and time, and the above operation is performed for each region, it is possible to add 2 k pieces (k bits) of information to the image.

As the watermark pattern, for example, what is produced by using the M-sequence (longest code sequence) can be used. The M-sequence is a series composed of binary symbols, a statistical distribution of the respective symbols is constant, and code correlation is 1 at the origin and −1/code length at other portions. Of course, the watermark pattern may be produced by a method other than using the M-sequence.

In the case where image data are recorded and reproduced in a digital manner, since the image data without any change have a very large amount of information, the image data are generally compressed. As a method of compressing the image data, a high efficiency coding system such as JPEG (coding system for a color still image) or MPEG (coding system for a color moving image) is internationally standardized and has been put to practical use. Data compressed by these high efficiency coding systems are called bit stream data or simply bit stream. As a comparable expression, an image prior to compression and an image after decoding are called a base band image or simply a base band.

It is convenient if a watermark can be easily detected by only adding the watermark to a base band image, even if the image is distributed as the base band image without any compression or as the bit stream after high efficiency coding such as JPEG or MPEG was performed. That is, it is preferable that the watermark added before compression with the high efficiency coding or the like can be used for detection commonly in both the base band and the bit stream.

FIG. 5 is a conceptual view for explaining the entire flow of addition and detection of a watermark to image information.

That is, in FIG. 5, base band image information is supplied to a watermark adding apparatus 10 through an input terminal 1, and information of a unit watermark wm to be added is supplied to the watermark adding apparatus 10 through a unit watermark input terminal 2. The unit watermark wm has a size corresponding to a small region of a part of an image as described later in detail.

In the watermark adding apparatus 10 of this example, a repetitive watermark WMR in a state where the unit watermark wm supplied from the input terminal 2 is repeated vertically and horizontally on the image is added to the base band image from the input terminal 1. The base band image information added with the repetitive watermark WMR is outputted through an output terminal 3.

The base band image added with the repetitive watermark WMR is supplied to an MPEG encoder 20, and is encoded in high efficiency through the MPEG system, so that it is made a bit stream and is outputted through an output terminal 4. The size of an encoded block in the MPEG encoding of this case is equal to the unit watermark wm, or the unit watermark wm is made to have such relation that it is equal to an integral number of encoded blocks. In other words, the size of the unit watermark wm is selected to be a size an integral number of times as large as the size of the encoded block.

The image information of the base band image added with the watermark WMR and outputted from the output terminal 3 is supplied to a watermark base band detecting apparatus 30 through an input terminal 5. In the watermark base band detecting apparatus 30, on the basis of the unit watermark wm from an input terminal 6 (equal to the unit watermark wm from the input terminal 2), the watermark is detected from the base band image information as described later, and the detection result is led out through an output terminal 7.

The image information of the bit stream added with the watermark WMR and outputted from the output terminal 4 is supplied to a watermark bit stream detecting apparatus 40 through an input terminal 8. In the watermark bit stream detecting apparatus 40, on the basis of the unit watermark wm from the input terminal 6, the watermark is detected from the bit stream image information as described later, and the detection result is led out through an output terminal 9.

The watermark adding apparatus 10 of FIG. 5 is constructed as shown in FIG. 6. This watermark adding apparatus is such an apparatus that the watermark WMR in which the unit watermark wm is repeated vertically and horizontally on the image is added to the image, and the image added with the watermark is outputted.

In this case, motion image data inputted through the image input terminal 1 can be expressed by $I(x, y, t)$ ($0 \leq x < \text{width}(I), 0 \leq y < \text{height}(I)$), and the unit watermark wm inputted through the unit watermark input terminal 2 is expressed by $W(x, y)$ ($0 \leq x < L, 0 \leq y < L$).

Where, x and y designate coordinates of each of pixels constituting the image in the horizontal direction and the vertical direction on the image, and t designates a time in an image unit. As shown also in FIGS. 8B and 8C, the width (I)

and the height (I) designate the width and the height of the image, respectively. As shown in FIG. 8A, L (a natural number) designates the width and height of the unit watermark wm.

The unit watermark wm inputted through the unit watermark input terminal 2 is inputted to a watermark repeating unit 103. The internal structure of this watermark repeating unit 103 is as shown in FIG. 7.

That is, as shown in FIG. 7, the watermark repeating unit 103 is provided with a memory 1031 having such a capacity that all elements of the repetitive watermark WMR corresponding to one image can be stored.

At the time of writing the unit watermark wm into the memory 1031, coordinate elements x and y of a coordinate (x, y) as to the unit watermark wm are inputted through an x-coordinate input terminal 11 and a y-coordinate input terminal 12. Then, memory addresses x and y corresponding to the input coordinate are set by address setting portions 1032 and 1033, and the unit watermark wm from the input terminal 2 is written in the memory 1031.

In this case, the address setting portion 1032 supplies, to the memory 1031, addresses to specify not only one memory position corresponding to the input coordinate (x, y) but also positions separate from the memory position in the vertical direction and the horizontal direction by a distance an integral number of times, like once, twice, three times, . . . , as large as L. Thus, as shown in FIGS. 8B and 8C, the watermark WMR in which the unit watermark wm repeats in the vertical direction and the horizontal direction of the image is written into the memory 1031.

That is, at every time when each value W(x, y) of the unit watermark is inputted, for all pairs of i and j (i and j are respectively a positive integer) satisfying $i\%L=x$, and $j\%L=y$ ($0 \leq i <$width $(I)$, $0 \leq j <$height $(I)$), repeat W(i, j)=W(x, y) is written into the memory repeatW holding the watermark after repetition. In this specification, "%" is an operator for finding a surplus.

This will be described with reference to FIGS. 8A to 8C. When the unit watermark W(x, y) of FIG. 8A is inputted, the watermark repeating unit 103 repeats the unit watermark W(x, y) to form the watermark WMR of FIG. 8B which has the width(I) and the height(I).

FIG. 8B shows the case where the width(I) of the image and the height(I) of the image can be respectively divided by the width and the height L of the unit watermark wm. In the case where they can not be divided, the repetitive water mark becomes as shown in FIG. 8C.

The coordinate (x, y) corresponding to each pixel position of the image information inputted from the image input terminal 1 is sequentially supplied through the x-coordinate input terminal 11 and the y-coordinate input terminal 12 into the memory 1031, so that the watermark WMR written in the memory 1031 of the watermark repeating unit 103 in the manner as described above is read out. The read out repetitive watermark WMR is transferred to a watermark embedding unit 101.

On the other hand, the base band image information inputted through the image input terminal 1 is sent to not only the watermark embedding unit 101 but also an embedding amount judging unit 102. The embedding amount judging unit 102 investigates the feature of the inputted image, judges, at each place of the image, the embedding amount of the watermark in which addition has scarcely an influence on picture quality, and transmits the amount to the watermark embedding unit 101.

In the watermark embedding unit 101, in accordance with the repetitive watermark WMR inputted from the watermark repeating unit 103, the watermark is embedded in the image sent from the image input terminal 1. At that time, the embedding amount is adjusted in accordance with the information of the embedding amount inputted from the embedding amount judging unit 102.

Here, the embedding amount judging unit 102 is necessary for improving the picture quality of the image added with the watermark, and is not indispensable for addition and detection of the repetitive watermark WMR. For example, even if addition with the same embedding amount is performed to all portions where the watermark pattern indicates that addition is performed without using the embedding amount judging unit 102, there does not occur a problem in detection of the watermark.

The image information added with the repetitive watermark WMR made by the watermark embedding unit 101 is outputted from the base band output terminal 3.

Here, the operation of the watermark embedding unit 101 will be described in detail.

When the embedding amount found by the embedding amount judging unit 102 with respect to the input image I(x, y, t) is made D(x, y, t), in the case where embedding is performed by the specified amount in the embedding unit 101, the image wmI(x, y, t) after addition of the watermark becomes $wmI(x, y, t) = I(x, y, t) + \text{repeat}W(x, y) \times D(x, y, t).$ When the watermark is added to all pixels by a constant embedding amount, the image wmI(x, y, t) after addition of the watermark is expressed using a constant D by $wmI(x, y, t) = I(x, y, t) + \text{repeat}W(x, y) \times D.$ Next, a structural example of the watermark base band detecting apparatus 30 will be described with reference to FIG. 9.

The watermark base band detecting apparatus 30 of FIG. 9 reads the image information of the base band and the pattern of the unit watermark wm, and outputs the information of the watermark contained in the base band image information. The information of the watermark is such that when the watermark exists in the image, it is the shift amount of position where the unit watermark is detected, and when the watermark does not exist in the image, it is information indicating nonexistence of the watermark. The shift amount of the position where the unit watermark is detected is equal to the shift amount between the pattern of the unit watermark wm to be compared and the unit watermark pattern in the watermark on the detected image.

As shown in FIG. 9, the image I(x, y, t) (see FIG. 10A) inputted from the base band image input terminal 5 is inputted into a folding accumulator 301, and as shown in FIG. 10B, it is folded and accumulated with the size of the unit watermark. When an equation is used, a folding accumulation result foldI(x, y) is expressed as follows:

$\text{fold}I(x, y) = \Sigma I(i\%L, j\%L, t)$ $i\%L=x, j\%L=y$

Since L is the horizontal and vertical size of the unit watermark wm, the folding accumulation result foldI(x, y) is space information having the same size as the unit watermark wm.

FIG. 11 shows a structural example of the folding accumulator 301. This folding accumulator 301 includes a memory 3012 having a capacity for at least the unit watermark wm of L×L elements, an accumulative adder 3011, and address setting portions 3013 and 3014 for the memory 3012.

To the accumulative adder 3011, the image information from the image input terminal 5 is inputted, and image elements of the unit watermark wm read out from the memory 3012 are also supplied, so that accumulative addition is made. The output of the accumulative adder 3011 is written in the memory 3012 at an address indicated by the address setting portions 3013 and 3014, and is read out. By this, a fold accumulation image output is obtained from the memory 3012, and is led out through an output terminal 33.

In this case, coordinate elements x and y of a coordinate (x, y) of a pixel as to an image, which are inputted from the input terminals 31 and 32, are supplied to the address setting portions 3013 and 3014, respectively. In the address setting portion 3013, the operation x%L for finding a surplus is performed, and the found surplus is supplied to the memory 3012 as the address x. In the address setting portion 3014, the operation y%L for finding a surplus is performed, and the found surplus is supplied to the memory 3012 as the address y. Through this addressing, folding accumulation is executed by the accumulative adder 3011 and the memory 3012.

In the case of carrying out folding accumulation in which folding in a unit of the size of the unit watermark and accumulation are performed like this, and in the case where, as shown in FIG. 12A, a folding region AR has no shift in regard to the watermark on the image, the watermark of the input image after folding accumulation comes to have quite the same pattern as the unit watermark wm as shown in FIG. 12B.

In the case where the folding region AR is shifted in regard to the watermark on the image as shown in FIG. 13A, the watermark of the input image after folding accumulation comes to have such a pattern that patterns obtained by dividing the unit watermark wm are gathered as shown in FIG. 13B.

However, when folding accumulation is performed as described above, naturally in the case where there is no image shift between the time of addition of the watermark and the time of detection of the watermark as shown in FIG. 12A, even in the case where there is a shift between the time of addition of the watermark and the time of detection of the watermark as shown in FIG. 13A, since the accumulated watermark components are always placed at the same position, they are emphasized, and when the number of times of accumulation becomes sufficiently large, the accumulated image components are cancelled out.

If the watermark is contained in the input image I(x, y, t), the folding accumulation result foldI(x, y) and what is obtained by shifting the unit watermark W(x, y) have correlation at all times. This correlation is investigated by using FFT (Fast Fourier Transform) as described below.

That is, the output of the folding accumulator 301 is inputted to an FFT unit 302, and after the FFT for L×L elements is carried out, the output is sent to a convolution arithmetic unit 303. The unit watermark wm (=W(x, y)) inputted from the unit watermark input terminal 6 is also subjected to the FFT for L×L elements by an FFT unit 304, and then, it is sent to the convolution arithmetic unit 303.

The convolution arithmetic unit 303 performs convolution of coefficients of the foregoing two FFT spaces, and sends the result to an inverse FFT unit 305. The convolution at the convolution arithmetic unit 303 is equivalent to correlating of combination of all shifts between both the unit watermark wm and the image after folding in the space region.

In the inverse FFT unit 305, inverse FFT is performed to the result obtained by the convolution arithmetic unit 303 so that it is returned to the space region. The output of all coefficients obtained by the inverse FFT at the inverse FFT unit 305 is supplied to a maximum value detector 306 and a variance calculator 307.

The maximum value detector 306 searches a maximum coefficient among coefficients obtained by the inverse TFT at the inverse FFT unit 305, and outputs the maximum coefficient and its coordinate.

All coefficients from the inverse FFT unit 305 and the coordinate value of the maximum coefficient from the maximum value detector 306 are inputted to the variance calculator 307, and variance of values other than the maximum value of the coefficient is calculated.

The variance calculated by the variance calculator 307 and the maximum coefficient found by the maximum value detector 306 are inputted to a normalizing unit 308. The output of the normalizing unit 308 is a value normalized by dividing the maximum coefficient by the variance. This value is inputted to a threshold value comparator 309 and is compared with a predetermined threshold value.

In the threshold value comparator 309, when the value obtained by dividing the maximum value inputted to this by the variance is smaller than the threshold value, it is judged that there is no watermark, and an output controller 310 is controlled so that the information indicating that there is no watermark is outputted through the watermark information output terminal 7.

In the threshold value comparator 309, if the value obtained by dividing the maximum value inputted to this by the variance is larger than the threshold value, it is judged that the watermark is contained, and the output controller 310 is controlled, so that the coordinate of the maximum coefficient detected by the maximum value detector 306, that is, the shift amount of the position where the watermark is contained is outputted through the watermark information output terminal 7.

As described above, in the watermark base band detecting apparatus of FIG. 9, correlation as to all possible shift amounts is obtained using convolution in the FFT region, and it is judged whether the watermark is added to the image on the basis of whether or not the maximum value of the correlation is larger than a predetermined standard.

In the case where the watermark is added to the image, although the shift amount is outputted as information, since it is the shift amount between the time of addition of the watermark and the time of detection of the watermark, it is impossible to make the amount have an absolute meaning. However, it is possible to make the amount have a relative meaning as described below.

Two watermarks of a certain watermark and a watermark obtained by multiplying each element of the certain watermark by −1 (that is, inverted pattern) are added to different phases of one image. The maximum value judgement unit 306 of FIG. 9 is replaced by a maximum/minimum value judgement unit for extracting both the maximum value and the minimum value, and the maximum value or minimum value and its coordinate among coefficients from the inverse FFT unit 305 are found. After the found maximum coefficient or minimum coefficient is normalized with variance, it is judged by the threshold value comparator 309 whether the absolute value of the maximum coefficient or minimum coefficient is larger than a threshold value, and in the case where it is larger, the difference in shift amounts of the two watermarks of the watermark where the maximum coefficient was detected and the watermark where the minimum coefficient was detected is made information. Since this information is relative, it does not change even if a shift occurs in the image.

Next, a structural example of the watermark bit stream detecting apparatus 40 will be described with reference to FIG. 14.

In FIG. 14, a bit stream of image data encoded by the MPEG encoder 20 is inputted to the bit stream image input terminal 8. The watermark bit stream detecting apparatus 40 receives input of the bit stream image and the pattern of a unit watermark wm, and outputs information of the watermark added to the image. Similarly to the foregoing, the information of the watermark is a shift amount of a position where the watermark is detected if the watermark exists on the bit stream image, and is information that there is no watermark if the watermark does not exist on the bit stream image.

The watermark bit stream detecting apparatus 40 of FIG. 14 has almost the same structure as the watermark base band detecting apparatus 30 of FIG. 9 except a portion. That is, the folding accumulator 301, the FFT unit 302, the convolution arithmetic unit 303, the FFT unit 304, the inverse FFT unit 305, the maximum detector 306, the variance calculator 307, the normalizing unit 308, the threshold value comparator 309, and the output controller 310 of FIG. 9 correspond to a folding accumulator 401, an FFT unit 402, a convolution arithmetic unit 403, an FFT unit 404, an inverse FFT unit 405, a maximum detector 406, a variance calculator 407, a normalizing nit 408, a threshold value comparator 409, and an output controller 410 of FIG. 14, respectively.

The difference from the watermark base band detecting apparatus 30 of FIG. 9 is that the input is changed from base band image data to bit stream image data, and a DCT (Discrete Cosine Transform) coefficient extractor 411 and an inverse DCT unit 412 are newly provided before and after the folding accumulator 301. In the following, a description will be made mainly on different points from the watermark base band detecting apparatus 30 of FIG. 9.

Bit stream image data inputted through the bit stream input terminal 8 are partially decoded by the DCT coefficient extractor 411, and a DCT coefficient of one picture is extracted.

Here, if inverse DCT is applied to the DCT coefficient to convert it into a pixel value in a space region, it is possible to subsequently make detection by the same apparatus as the watermark base band detecting apparatus 30 of FIG. 9. However, in order to decrease a calculation amount, in the watermark bit stream detecting apparatus 40 of FIG. 14, the output of the DCT coefficient extractor 411 is supplied to the folding accumulator 401, and after folding accumulation is performed, it is supplied to the inverse DCT unit 412 and inverse DCT is performed.

In the case of an encoding system like MPEG2, DCT of two modes of a frame and a field is adaptively used. FIGS. 15A and 15B show a block in the case of DCT of the frame mode, and FIGS. 16A and 16B show a block in the case of DCT of the field mode.

That is, in the frame mode, a macro block 201 of FIG. 15A is divided into four DCT blocks 202, 203, 204, and 205 shown in FIG. 15B. In the field mode, a macro block 201 of FIG. 16A is divided into four DCT blocks 206, 207, 208, and 209 shown in FIG. 16B.

As shown in FIGS. 15A and 15B and FIGS. 16A and 16B, the ranges of pixels occupied by the block where the frame DCT is performed and the block where the field DCT is performed is different from each other.

However, it is common that a region where two DCT blocks are vertically combined is a region of horizontal× vertical=8×16 pixels. In this example, in order to make it possible to deal with any case where DCT is performed in either mode of the frame mode and the field mode, a region of 8×16 pixels in which two DCT blocks are vertically combined is treated as one unit encoded block.

When an image is divided into the encoded blocks (DCT blocks), a set of coefficients of a block at a x-th position in the horizontal direction and at a y-th position in the vertical direction, that is, two DCT blocks starting from a pixel with a coordinate of horizontal 8 x and vertical 16 y is divided into a part in a case where the frame DCT is used and a part in a case where the field DCT is used, and they are made FrDCT(x, y, t) and FiDCT(x, y, t), respectively. Here, counting of a number begins from zero.

The folding accumulator 401 receives these DCT coefficients from the DCT coefficient extractor 411, performs folding accumulation, and transfers them to the inverse DCT unit 412. When what was subjected to the folding accumulation is made foldFrDCT(x, y) and foldFiDCT(x, y), they are expressed by the following equations.

$$\text{fold}FrDCT(x, y) = \Sigma FrDCT(i, j, t)$$

$$i\%(L/8)=x, j\%(L/16)=y$$

$$\text{fold}FiDCT(x, y) = \Sigma FiDCT(i, j, t)$$

$$i\%(L/8)=x, j\%(L/16)=y$$

However, in order that folding accumulation can be made without any change to this DCT region, it is assumed that L/8 and L/16 can be divided and are integers.

For example, in the case of FIG. 17A, the size of the unit watermark is L=32. In this case, in the range of the unit watermark, as shown in FIG. 17A, there are encoded blocks of 8×16 pixels, the number thereof being 4 (=L/8) in the horizontal direction and 2 (=L/16) in the vertical direction. In this case, since the size can be divided to become L/8=4 and L/16=2, folding accumulation can be made without any change to the DCT region. That is, with respect to eight blocks of 8×16 pixels in the range of the region of L×L of the unit watermark, as shown in FIGS. 17B and 17C, accumulation is performed after division is made into the frame DCT and the field DCT.

In the inverse DCT unit 412, the DCT coefficient of accumulated output of the folding accumulator 401 is subjected to inverse DCT to return it into the space region, and it is sent to the FFT unit 402. The value sent to the FFT unit 402 is such that the number of elements is L×L, each is the sum of pixel values, and is the same as the output of the folding accumulator 301 of FIG. 9. The subsequent steps are the same as the case of the base band.

In the adding apparatus of the watermark and the detecting apparatus as described above, by a method in which mapping is performed into the FFT space and a search in the space is performed through convolution in the FFT space, detection of a shift of the watermark over the whole image is made possible. Besides, FFT is applied after the image is subjected to folding accumulation, so that the calculation amount of the FFT is decreased.

However, the watermark repeating unit 103 of the watermark adding apparatus 10 shown in FIG. 7 stores information of the watermark WMR for one image in the memory 1031, and there is an ineffective point that plural sets of information of the unit watermarks having the same pattern are held in the memory 1031.

Besides, since the unit watermark with the same size L in the number of pixels in the horizontal and vertical directions is used for the added image by the foregoing watermark adding method, labor of a person who attacks a watermark system to analyze the watermark is little, and there is a fear that the attack becomes easy.

Besides, since the same unit watermarks are simply arranged in one frame or one field, it is possible for a person attacking the watermark system to erase the watermark relatively easily, so that there is a fear that it becomes impossible to effectively prevent illegal use such as illegal copying of image information.

OBJECT AND SUMMARY OF THE INVENTION

A first object of the present invention is to provide an associated information adding apparatus using a watermark, which can use, as a memory of a watermark repeating unit, a small capacity memory capable of only storing information of one unit watermark.

A second object of the invention is to realize a state where such attack to a watermark system as to erase a watermark or analyze the watermark is made difficult without complicating an adding apparatus and a detecting apparatus of the watermark.

In order to achieve the first object, an associated information adding apparatus of the invention comprises a memory for storing a unit watermark; a unit watermark repeating means for repeatedly reading out the unit watermark from the memory by using a surplus obtained when a pixel position coordinate value of an image in a vertical direction and a horizontal direction is divided by a size of a vertical and horizontal repetitive unit of the unit watermark; and adding means for adding the unit watermarks read out by the unit watermark repeating means to image information so as to repeat the unit watermarks on the image vertically and horizontally.

According to the invention of the foregoing structure, the memory included in the associated information adding apparatus stores one unit watermark. The unit watermark repeating means divides each pixel position coordinate value of the image to be added with a watermark by the size of the vertical and horizontal repeating unit of the unit watermark, and uses the surplus to repeatedly read out the unit watermark from the memory. The unit watermark read out from the memory is sequentially added to the image information by the adding means. By this, the image information is added with the watermark in which the unit watermarks are repeated on the image vertically and horizontally.

As described above, it is sufficient if the memory included in the associated information adding apparatus has a capacity for storing one unit watermark, and it is not necessary to store a repetitive watermark pattern for one image (one frame or one field) in the memory.

Besides, in order to achieve the second object, the associated information adding apparatus of the invention is characterized in that the vertical and horizontal size of the unit watermark is selected to be N≠M.

According to this, it is not necessary that the size of the unit watermark is made such that the vertical and horizontal sizes are equal to each other, but the vertical and horizontal sizes can be independently freely selected. Thus, it is possible to complicate analysis of the watermark made by a person who attempts to attack the watermark system, and the system becomes hard to attack.

Besides, in order to achieve the second object, the associated information adding apparatus of the invention comprises repetitive watermark producing means for producing a repetitive watermark in which the unit watermark is shifted in a horizontal direction (or vertical direction) by a constant amount at every row (or every column) where the unit watermark is repeatedly arranged in the horizontal direction; and adding means for adding the repetitive watermark from the repetitive watermark producing means to image information.

According to this invention, in one image (frame or field), the repetitive watermark in which the unit watermark is sequentially repeated by a constant amount at every row (every column) is added to the image, so that it is possible to complicate analysis of the watermark made by a person who attempts to attack the watermark system, and the system becomes hard to attack.

Besides, in order to achieve the second object, the associated information adding apparatus of the invention comprises repetitive watermark producing means for producing a repetitive watermark in which the unit watermark is shifted in a vertical direction and/or a horizontal direction by a constant amount for every constant time in a unit of an image; and adding means for adding the repetitive watermark from the repetitive watermark producing means to image information.

According to this invention, since the repetitive watermark added to the image comes to have such a state that the whole repetitive watermark is shifted in the vertical direction and/or horizontal direction for every frame (or field) or every plural frames (or fields) in the unit of the image of one frame (or one field), even if the image is simply accumulated in the time direction (frame or field direction), the added watermark does not become clear, so that it is possible to complicate analysis of the watermark made by a person who attempts to attack the watermark system, and the system becomes hard to attack.

BRIEF DESCRIPTION OF THE DRAWINGS

FIGS. 15A and 15B are views for explaining an encoded block (DCT block) at a frame mode of MPEG compression encoding.

FIG. 26 is a block diagram of the fourth embodiment of the associated information adding apparatus of the invention.

DETAILED DESCRIPTION OF THE INVENTION

Embodiments of the present invention will be described below with reference to the drawings. Also in the embodiments described below, it is assumed that the stream of information relative to addition and detection of a watermark is the same as that shown in FIG. 5.

[First Embodiment]

Figure 6:
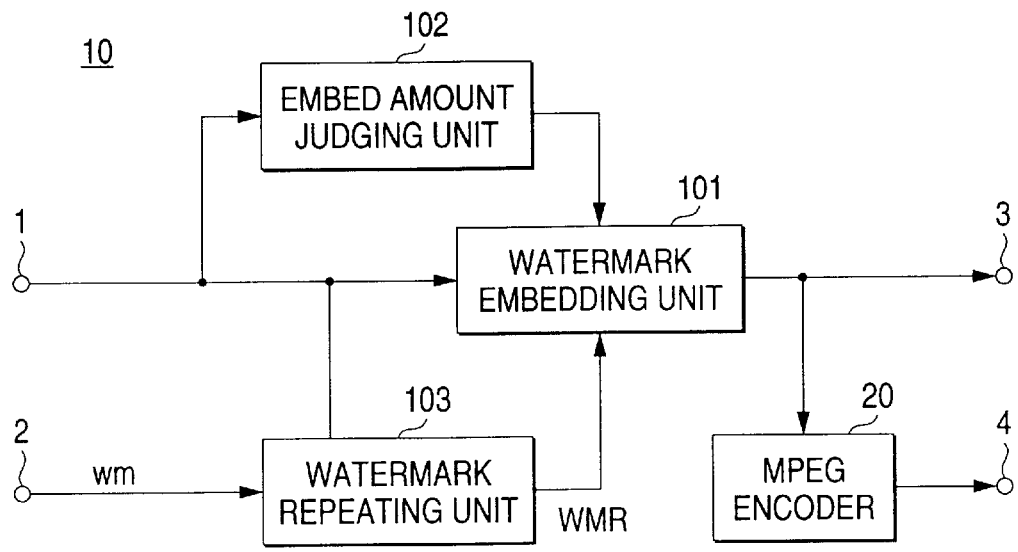
FIG. 6 is a block diagram of the associated information adding apparatus.
Figure 7:
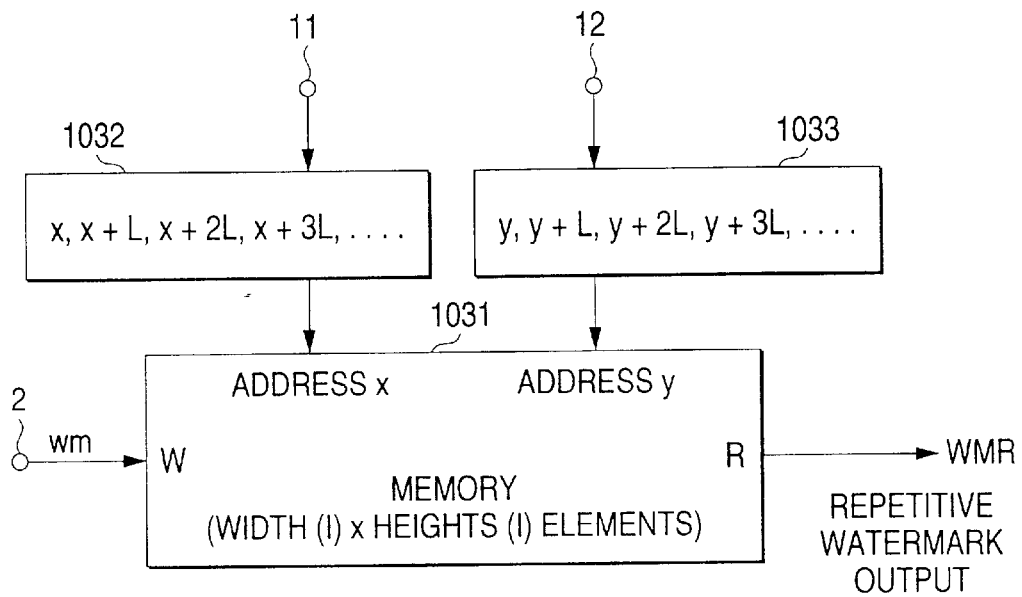
FIG. 7 is a block diagram of a watermark repeating unit.

A first embodiment is a watermark adding apparatus in which the memory capacity required for the watermark repeating unit in the watermark adding apparatus shown in FIG. 6 is decreased, and portions corresponding to those of FIG. 6 are designated by the same reference numerals.

Figure 18:
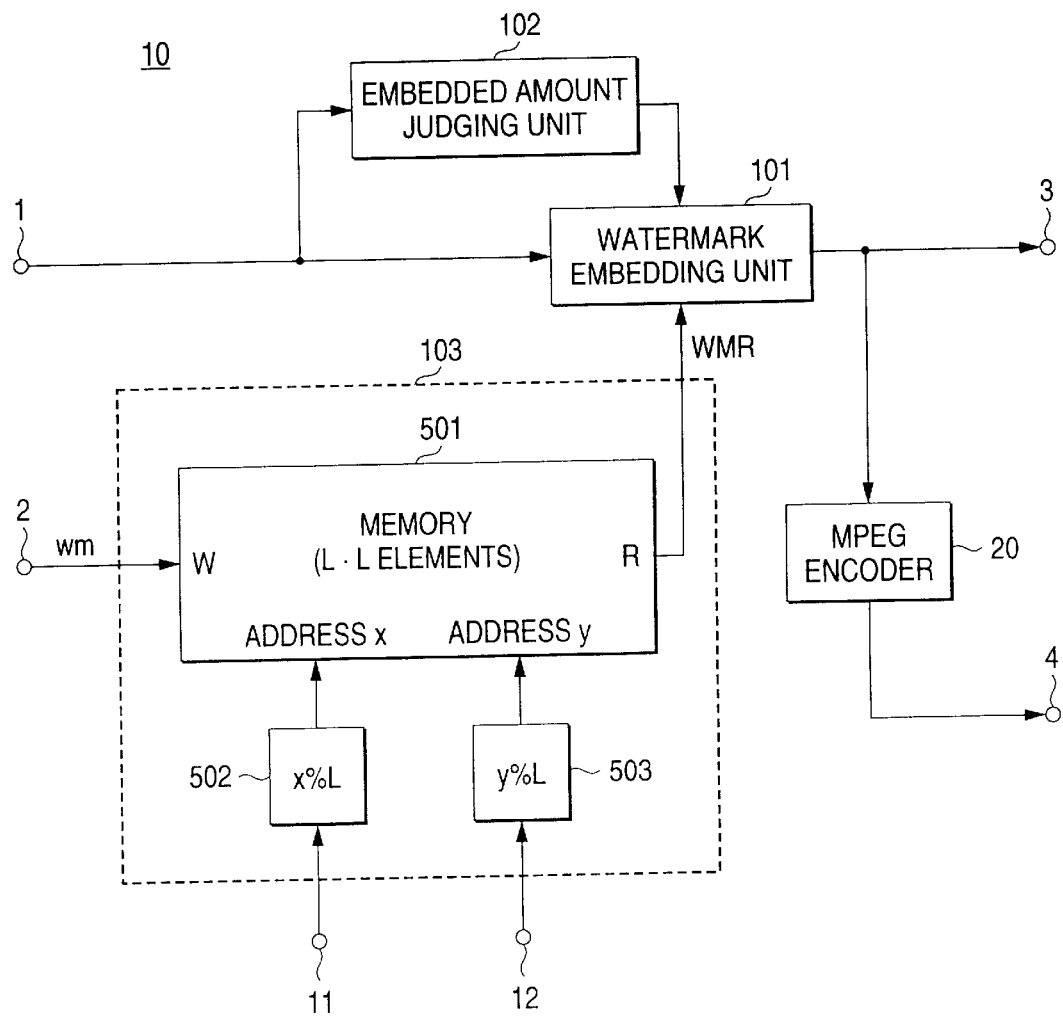
FIG. 18 is a block diagram of a first embodiment of an associated information adding apparatus of the invention.

FIG. 18 is a block diagram of a watermark adding apparatus as an example of an associated information adding apparatus of this embodiment. In FIG. 18, a portion different from FIG. 6 is an inner structure of a watermark repeating unit 103. Incidentally, the watermark repeating unit 103 is an example of repetitive watermark producing means recited in each claim and corresponds to unit watermark repeating means in each claim.

Figure 8A:
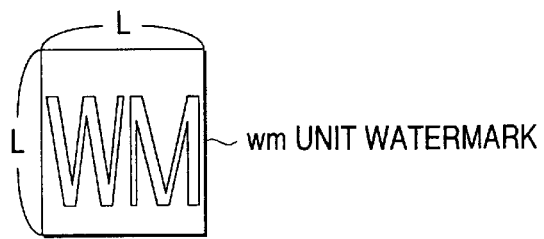
FIGS. 8A to 8C are views for explaining production of a repetitive watermark.

That is, the watermark repeating unit 103 of the watermark adding apparatus of this embodiment includes a memory 501 having such a capacity that merely elements of one unit watermark wm can be stored, and address setting portions 502 and 503. In the case of this example, the unit watermark having vertical×horizontal=L×L pixels shown in FIG. 8A is used as the unit watermark wm. Thus, it is sufficient if the memory 501 has a capacity for storing L×L elements.

Incidentally, the size of this unit watermark wm is made a size of an integer number of encoded blocks (DCT blocks) in MPEG compression encoding, which is the same as the foregoing. In the case of MPEG2, both the frame mode and the field mode shown in FIGS. 15A and 15B and FIGS. 16A and 16B are considered, which is also the same as the foregoing.

The operation of the watermark repeating unit 103 in the adding apparatus of the first embodiment is as follows:

That is, first, when the unit watermark wm is written in the memory 501, the unit watermark wm is inputted through the unit watermark input terminal 2, and an x-coordinate element and a y-coordinate element of a coordinate (x, y) as to the unit watermark wm are inputted through the x-coordinate input terminal 11 and the y-coordinate input terminal 12, and the unit watermark wm is stored in the memory 501. Incidentally, in the case of this example, the origin of the coordinate is made a left upper corner on an image. The same applies to the unit watermark wm. It is assumed that this relation similarly applies to all embodiments described later.

As described above, although it is possible to construct the whole repetitive watermark WMR in the memory 501, in the watermark repeating unit 103 of FIG. 18, one unit watermark wm is held in the memory 501 as described above, and the repetitive watermark WMR in which the unit watermark is repeated is obtained by controlling a method of reading the memory 501.

That is, when the repetitive watermark WMR is read out, an x-coordinate element and a y-coordinate element of a coordinates (x, y) as to one image are inputted through the input terminals 11 and 12, and operations of x%L and y%L (L is a vertical size and a horizontal size of the unit watermark, and "%" is an operator for obtaining a surplus as described before) are performed at the address setting portions 502 and 503, respectively. A surplus as an operation result is supplied from the address setting portions 502 and 503 respectively to the address x and the address y of the memory 501, and an address signal for repeatedly reading the unit watermark wm in the memory 501 is generated.

That is, the read out coordinate (x, y) inputted through the input terminals 11 and 12 is converted into a coordinate (x%L, y%L) relative to the unit watermark wm by the address setting portions 502 and 503, and reading of the watermark at the coordinate (x, y) is performed by reading of a value at the coordinate (x%L, y%L) on the memory 501 in which the unit watermark wm is held.

Figure 8B:
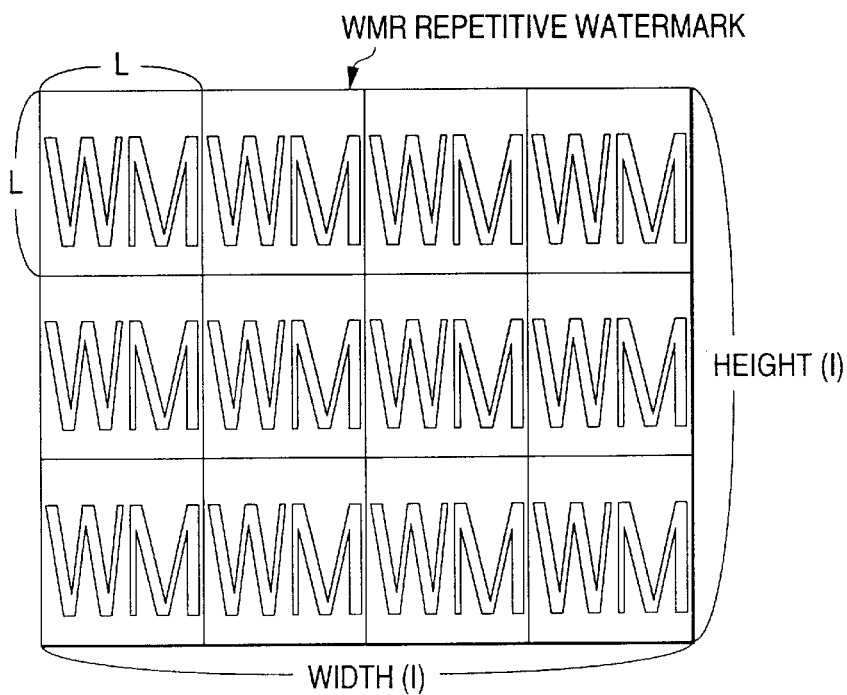
Figure 9:
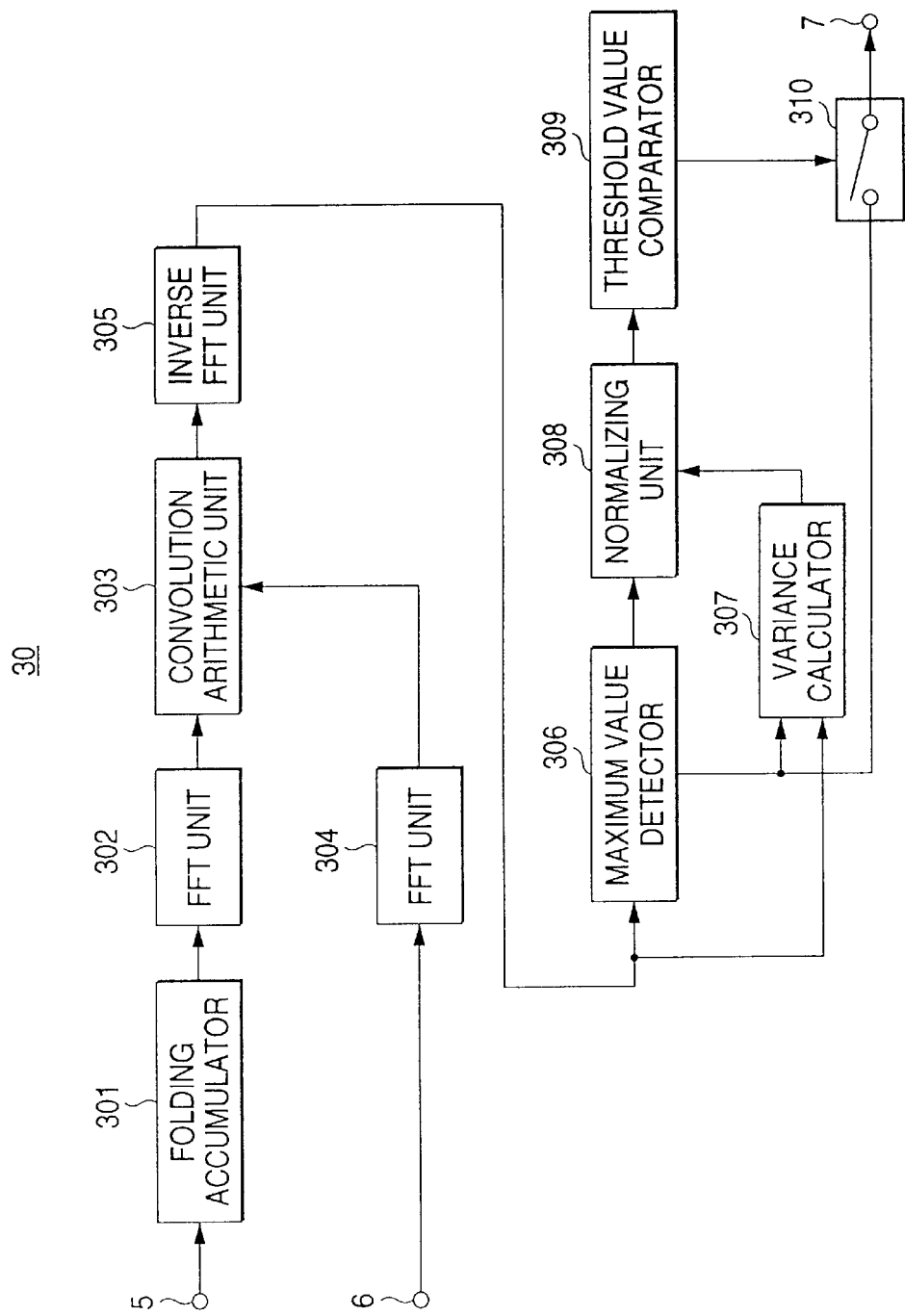
FIG. 9 is a block diagram of a watermark base band detecting apparatus.
Figure 10B:
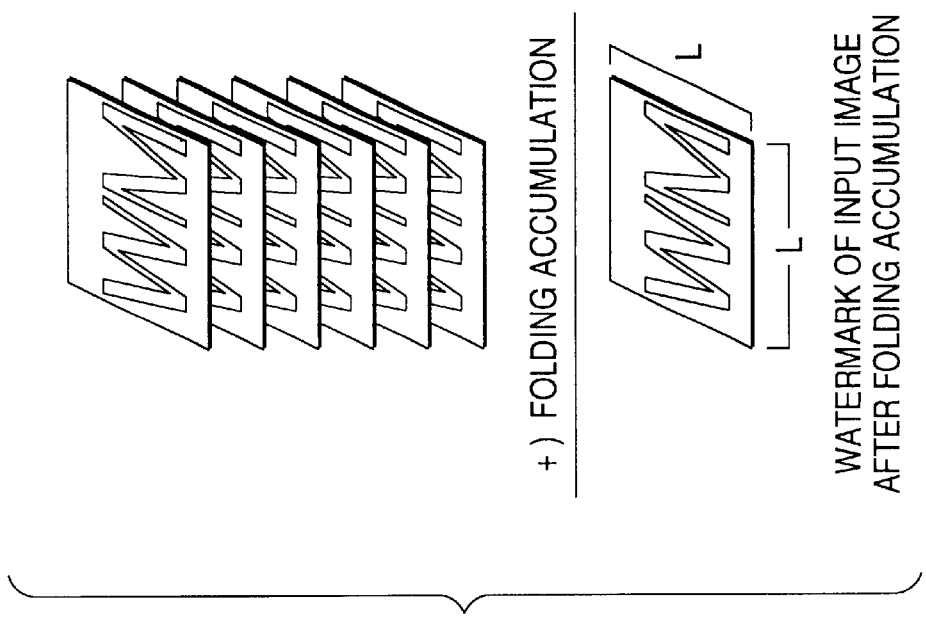
FIGS. 10A and 10B are views for explaining a folding accumulation processing to detect a watermark.
Figure 10A:
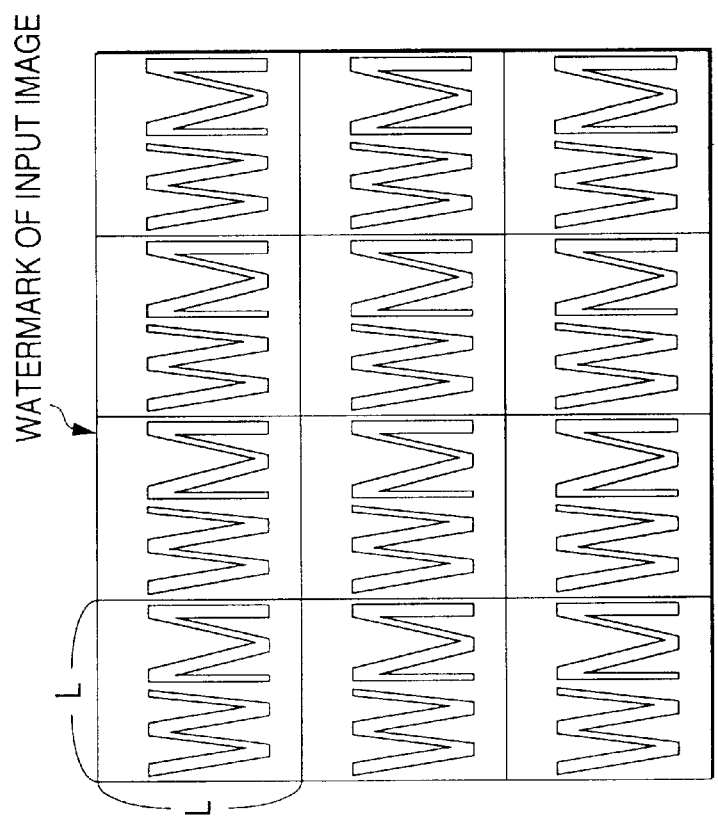
Figure 11:
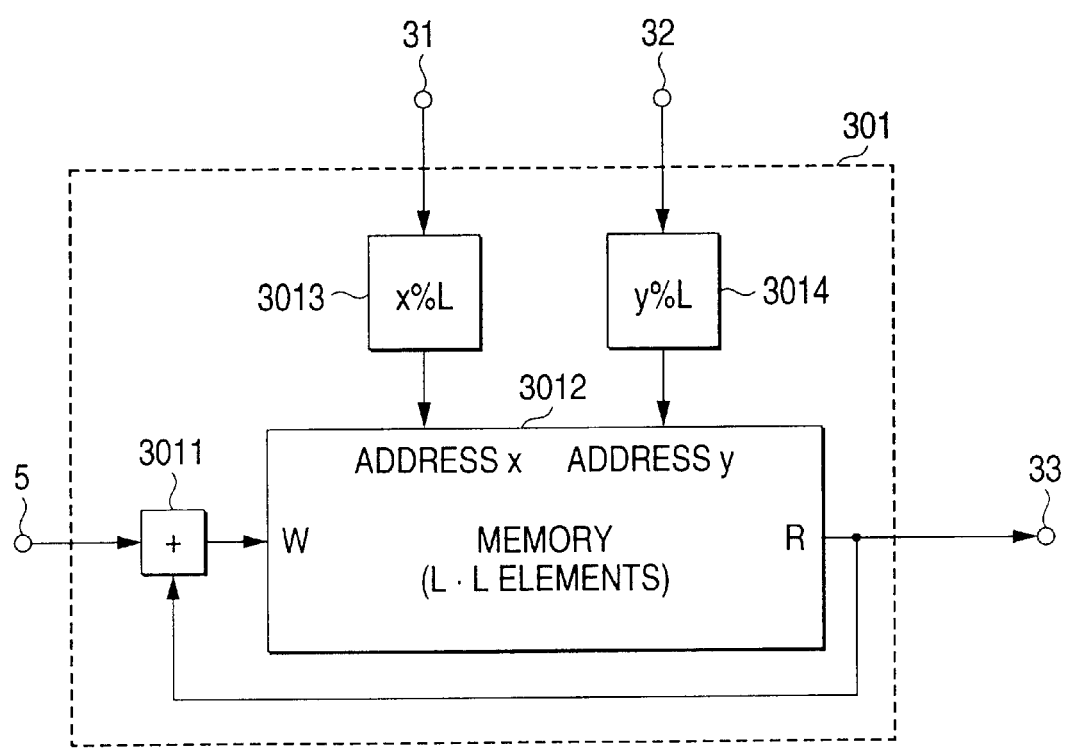
FIG. 11 is a block diagram of an example of a folding accumulator.
Figure 12A:
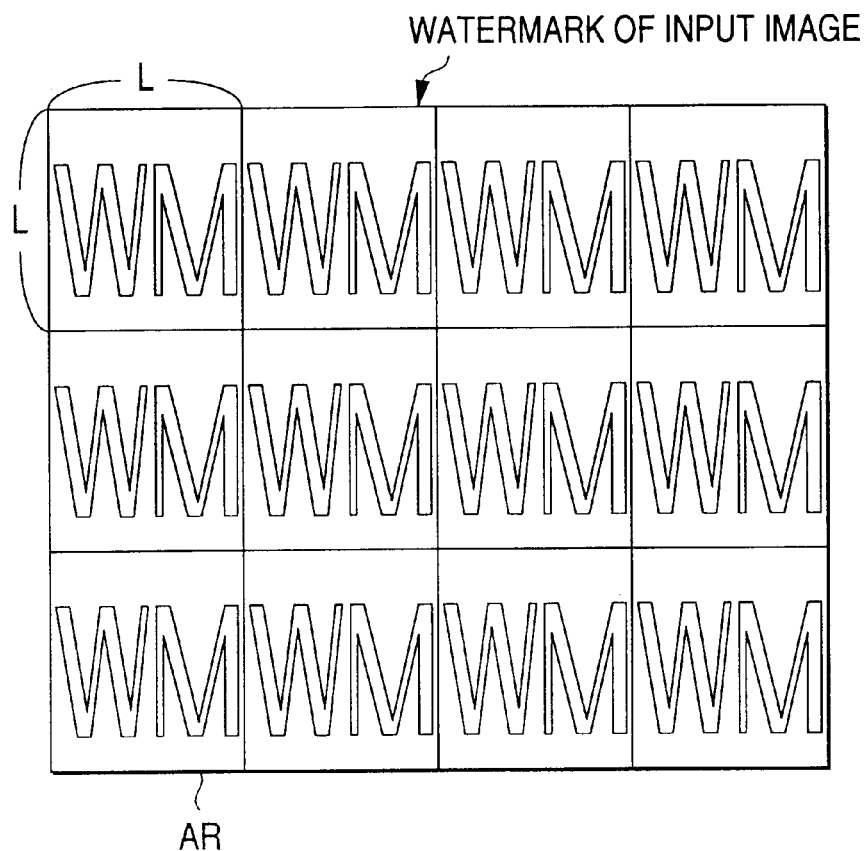
FIGS. 12A and 12B are views for explaining an accumulation result of folding accumulation.
Figure 12B:
Figure 13A:
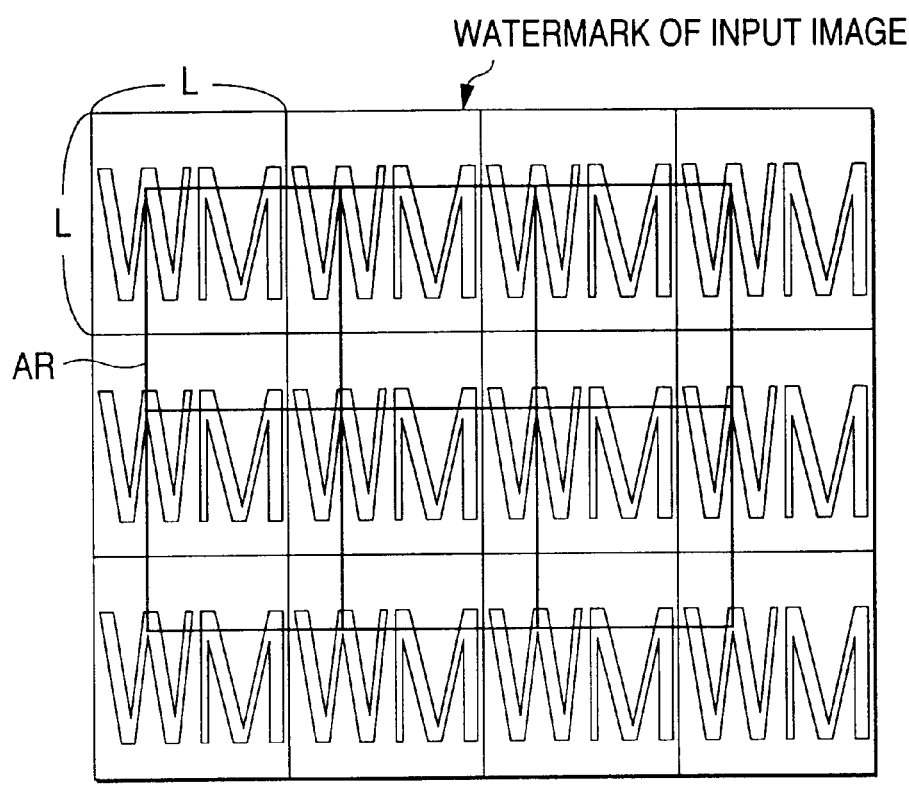
FIGS. 13A and 13B are views for explaining an accumulation result of folding accumulation.
Figure 13B:
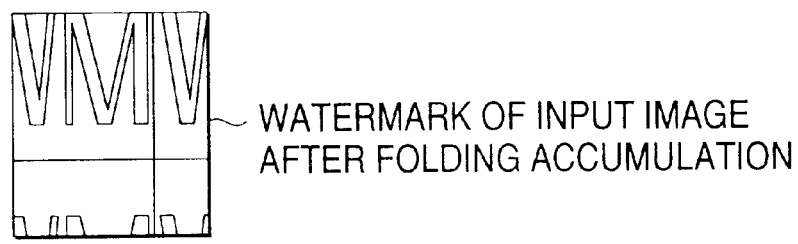
Figure 14:
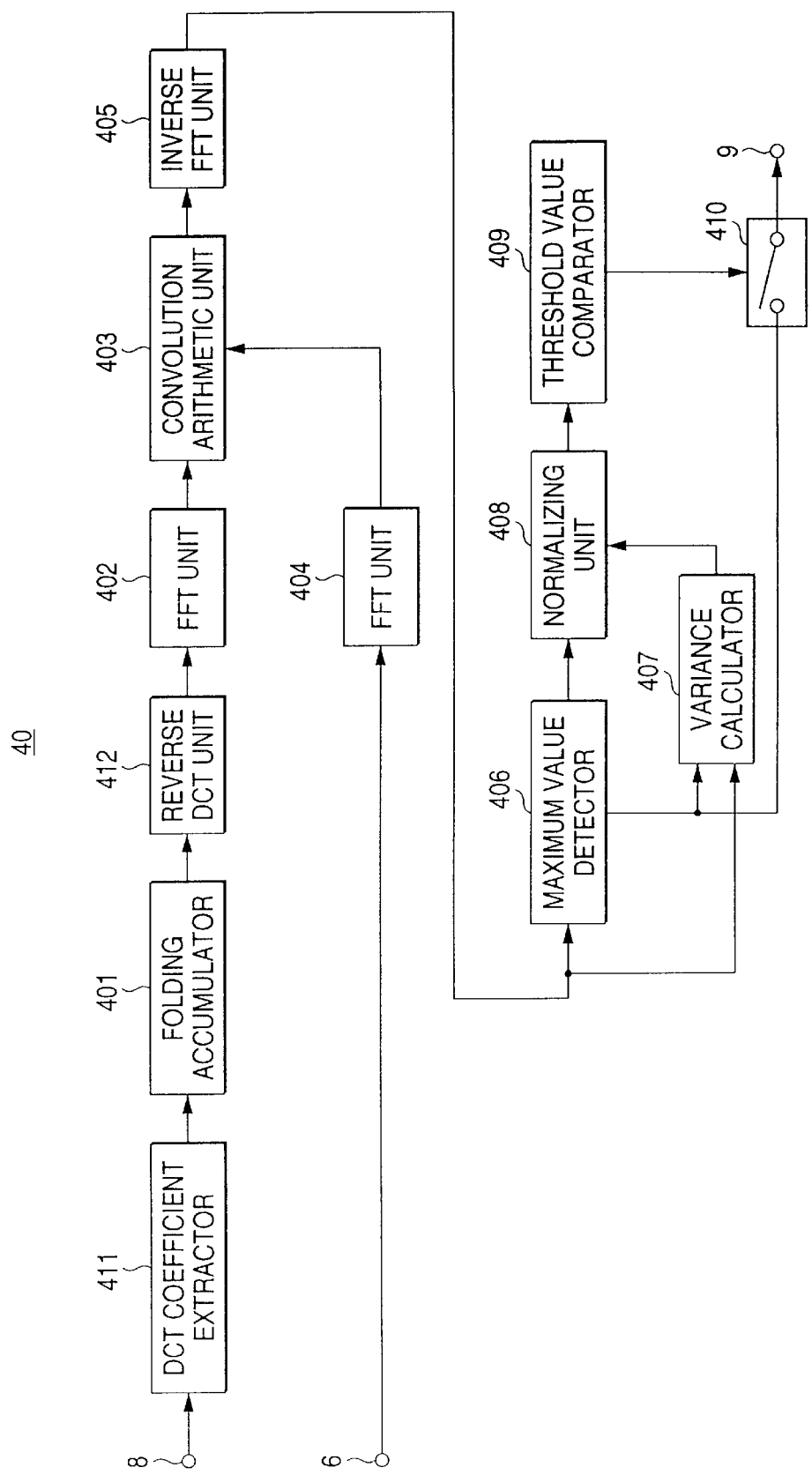
FIG. 14 is a block diagram of a watermark bit stream detecting apparatus.
Figure 16A:
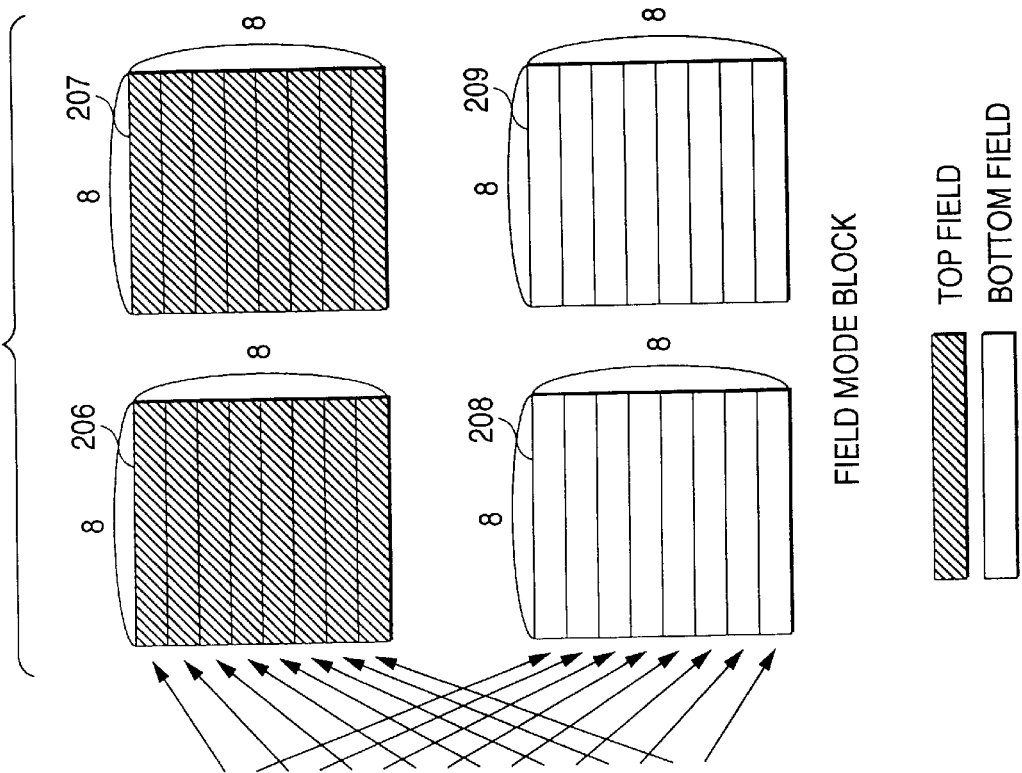
FIGS. 16A and 16B are views for explaining an encoded block (DCT block) at a field mode of MPEG compression encoding.
Figure 16B:
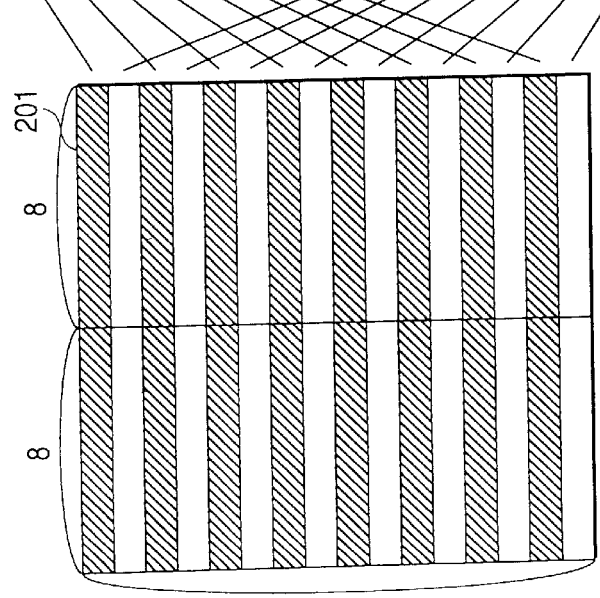
Figure 17A:
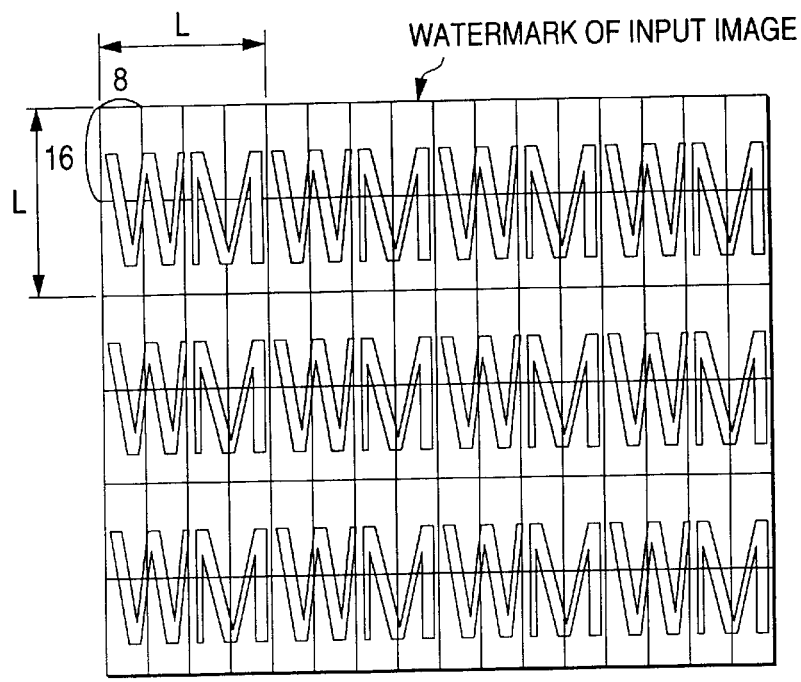
FIGS. 17A to 17C are views for explaining a size relation between a unit watermark and an encoded block.
Figure 17B:
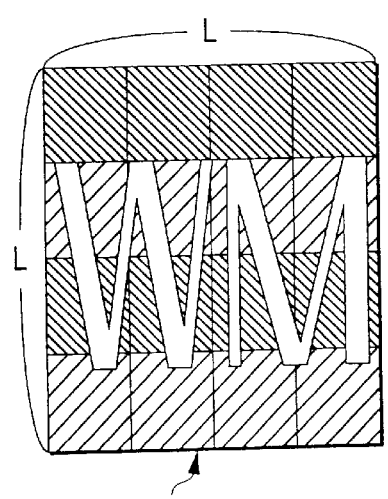
Figure 17C:
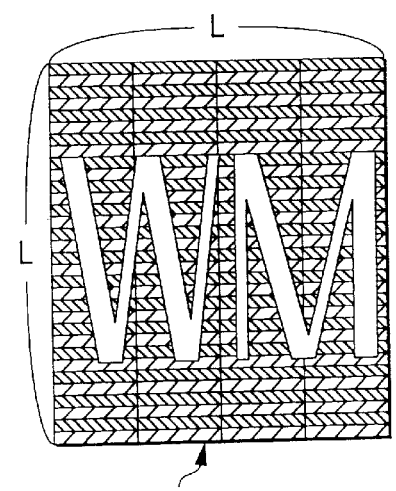

Since the watermark pattern added by the watermark adding apparatus of FIG. 18 becomes a repetitive watermark WMR quite the same as the example shown in FIG. 8B, detection of the watermark added by this watermark adding apparatus can be performed by the same detecting apparatus as the watermark detecting apparatus shown in FIG. 9 in the case of detection in a base band, and by the same detecting apparatus as the watermark detecting apparatus shown in FIG. 14 in the case of detection in a bit stream.

As described above, the watermark adding apparatus of the first embodiment has such a merit that in order to obtain the repetitive watermark WMR, a memory having a capacity for the same size as an image to which the repetitive watermark WMR is added is not necessary, but a memory having a small capacity for the unit watermark wm is sufficient.

Incidentally, in the foregoing description, since a repetitive unit of the unit watermark wm in the vertical direction and the horizontal direction is equal to the vertical and horizontal size of the unit watermark wm, the elements of the coordinate (x, y) are divided in the address setting portions 502 and 503 by L of the vertical and horizontal size. However, in the case where the size of the unit watermark wm is different from the size of a repetitive unit of the unit watermark wm in the vertical direction and the horizontal direction, the address setting portions 502 and 503 output surpluses obtained by dividing the elements of the coordinate (x, y) by the value of the repetitive unit. The same applies to an address setting portion of a folding accumulator of a watermark detecting apparatus.

[Second Embodiment]

A second embodiment is characterized in that vertical and horizon sizes of a unit watermark wm are not made equal to each other but are independently changed to different vertical and horizontal values, so that the pattern of a watermark is made hard to understand, and the watermark is made hard to attack.

Figure 19A:
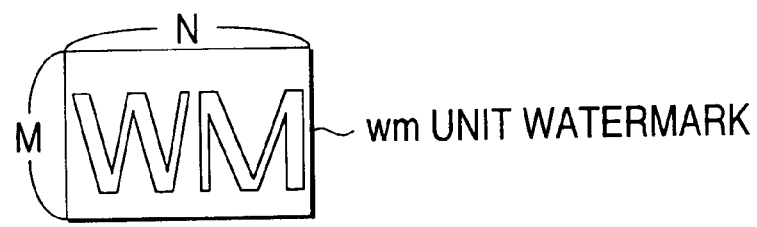
FIGS. 19A and 19B are views for explaining a second embodiment of an associated information adding apparatus of the invention.
Figure 19B:
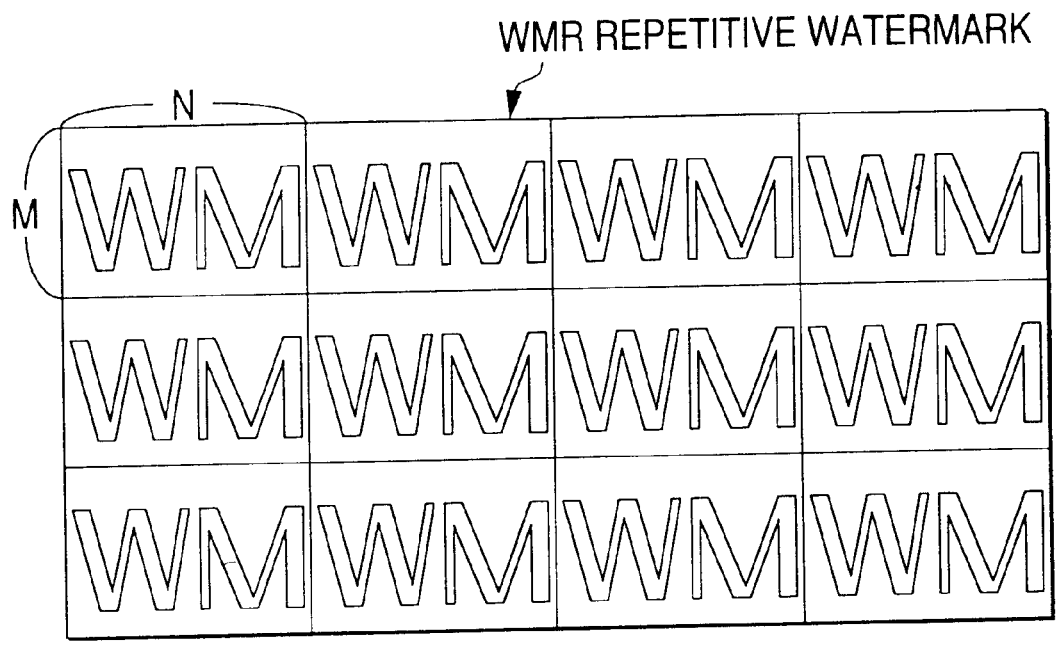

That is, in this second embodiment, as shown in FIG. 19A, the size of the unit watermark wm is made horizontal× vertical=N×M (N≠M). Thus, a pattern of a repetitive watermark WMR becomes such as shown in FIG. 19B.

The size of the unit watermark wm in this case is also made a size of an integral number of encoded blocks (DCT blocks) in MPEG compression encoding, which is the same as the case of the first embodiment. In the case of MPEG 2, both the frame mode and the field mode shown in FIGS. 15A and 15B and FIGS. 16A and 16B are considered, which is the same as the foregoing.

Figure 5:
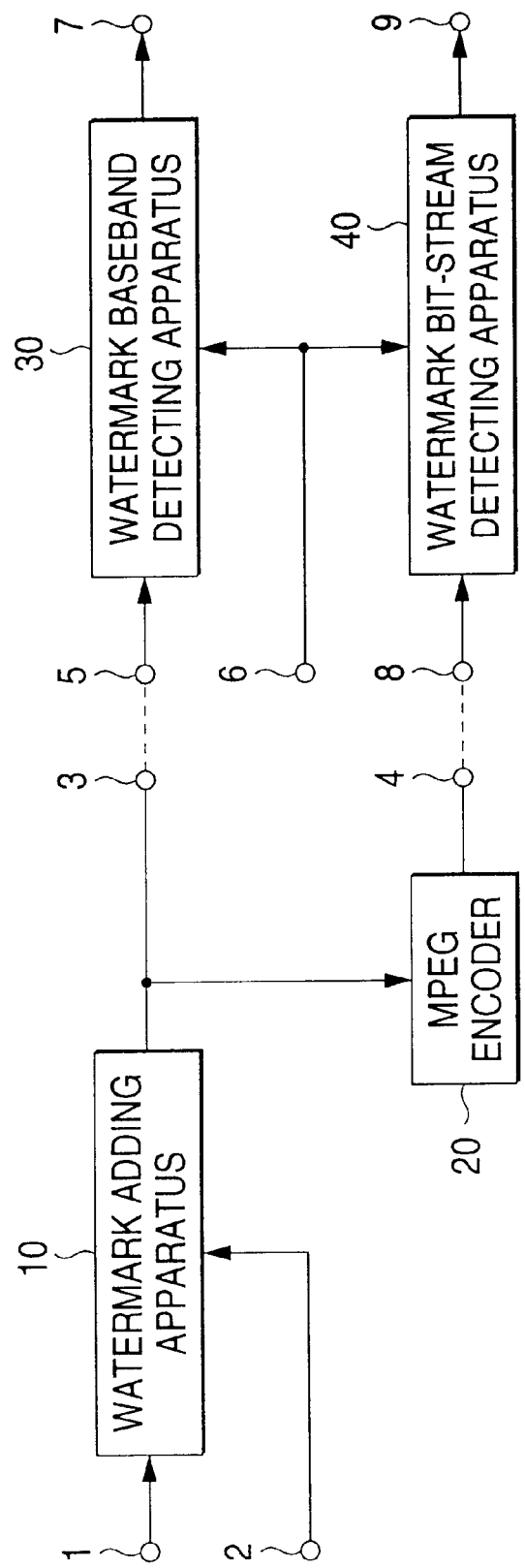
FIG. 5 is a view for explaining the stream of a system structure including an associated information adding apparatus and an associated information detecting apparatus.

Also in this second embodiment, the stream of the system is expressed as in FIG. 5, and the watermark adding apparatus 10, the watermark base band detecting apparatus 30, and the watermark bit stream detecting apparatus 40 are main components.

The watermark adding apparatus 10 of this second embodiment is different from the watermark adding apparatus of the first embodiment shown in FIG. 18 in the point that the sizes of the unit watermarks wm are different from each other and in the point accompanying the former point.

Figure 20:
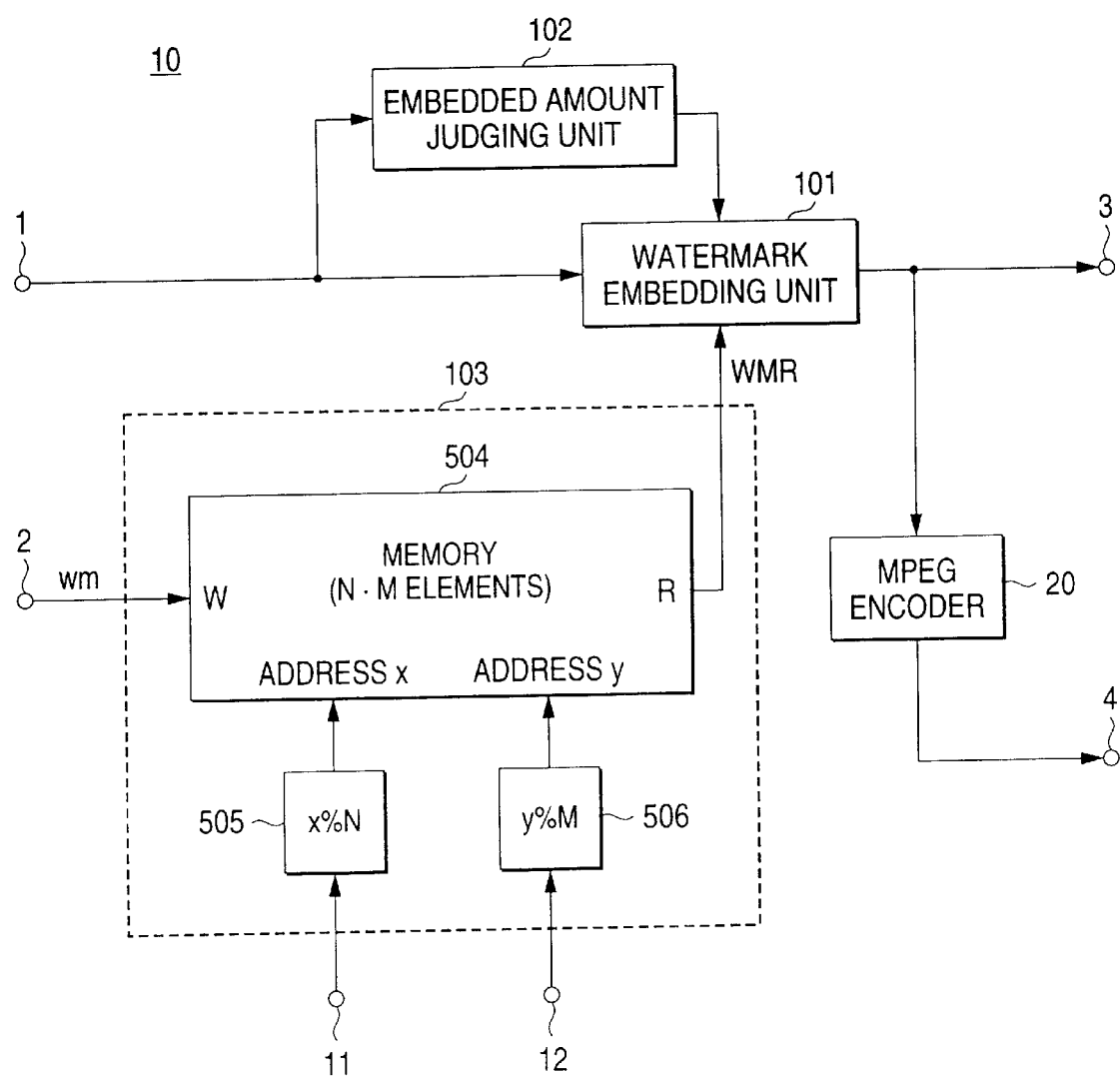
FIG. 20 is a block diagram of the second embodiment of the associated information adding apparatus of the invention.

FIG. 20 is a block diagram of a structural example of the watermark adding apparatus of the second embodiment.

In the unit watermark wm of the watermark adding apparatus of the first embodiment shown in FIG. 18, the vertical and horizontal sizes are equal to each other. On the contrary, the second embodiment uses such a unit watermark wm that as shown in FIG. 19, the vertical and horizontal sizes are different from each other but are independently set. Thus, the structure of the watermark adding apparatus is different from the watermark adding apparatus of the first embodiment only in the portion of the watermark repeating unit 103.

That is, in the watermark repeating unit 103 of FIG. 20, a memory for storing information of the unit watermark wm is made a memory 504 for storing horizontal and vertical elements of the unit watermark wm, that is, N×M elements. The watermark repeating unit 103 of this second embodiment is different from the watermark repeating unit 103 of the first embodiment of FIG. 18 in a method of obtaining a surplus when an address is specified at reading of the unit watermark wm, and address setting portions 505 and 506 are provided.

At the time of writing, the unit watermark wm of FIG. 19A is inputted through the unit watermark input terminal 2, and an x-coordinate element and a y-coordinate element of a coordinate (x, y) as to the unit watermark wm are inputted through the x-coordinate input terminal 11 and the y-coordinate input terminal 12, so that the unit watermark wm is stored in the memory 504.

At the time of reading, in the same manner as the case of the first embodiment, an x-coordinate element and a y-coordinate element of a coordinate (x, y) relative to one image are inputted through the input terminals 11 and 12. However, in the address setting portions 505 and 506, surpluses are obtained by dividing the x coordinate and the y coordinate from the x-coordinate input terminal 11 and the y-coordinate input terminal 12 by the size N of the unit watermark in the horizontal direction and the size M in the vertical direction, respectively, and they are inputted as an address x and an address y of the memory 504.

By this, the repetitive watermark WMR as shown in FIG. 19B in which the unit watermark wm of FIG. 19A is repeated vertically and horizontally on an image is obtained from the memory 504, and is embedded to image information from the input terminal 1 by the watermark embedding unit 101.

The watermark detecting apparatuses 30 and 40 of the second embodiment are different from the watermark detecting apparatus of FIG. 9 in the method of obtaining the unit watermark and in the portion of a folding accumulator, so that the watermark added by the watermark adding apparatus 10 of the embodiment described with reference to FIG. 20 can be detected. However, since the difference is the same between the watermark detecting apparatus 30 in the base band and the watermark detecting apparatus 40 in the bit stream, the following description will be made mainly on the watermark detecting apparatus 30 in the base band.

Figure 21:
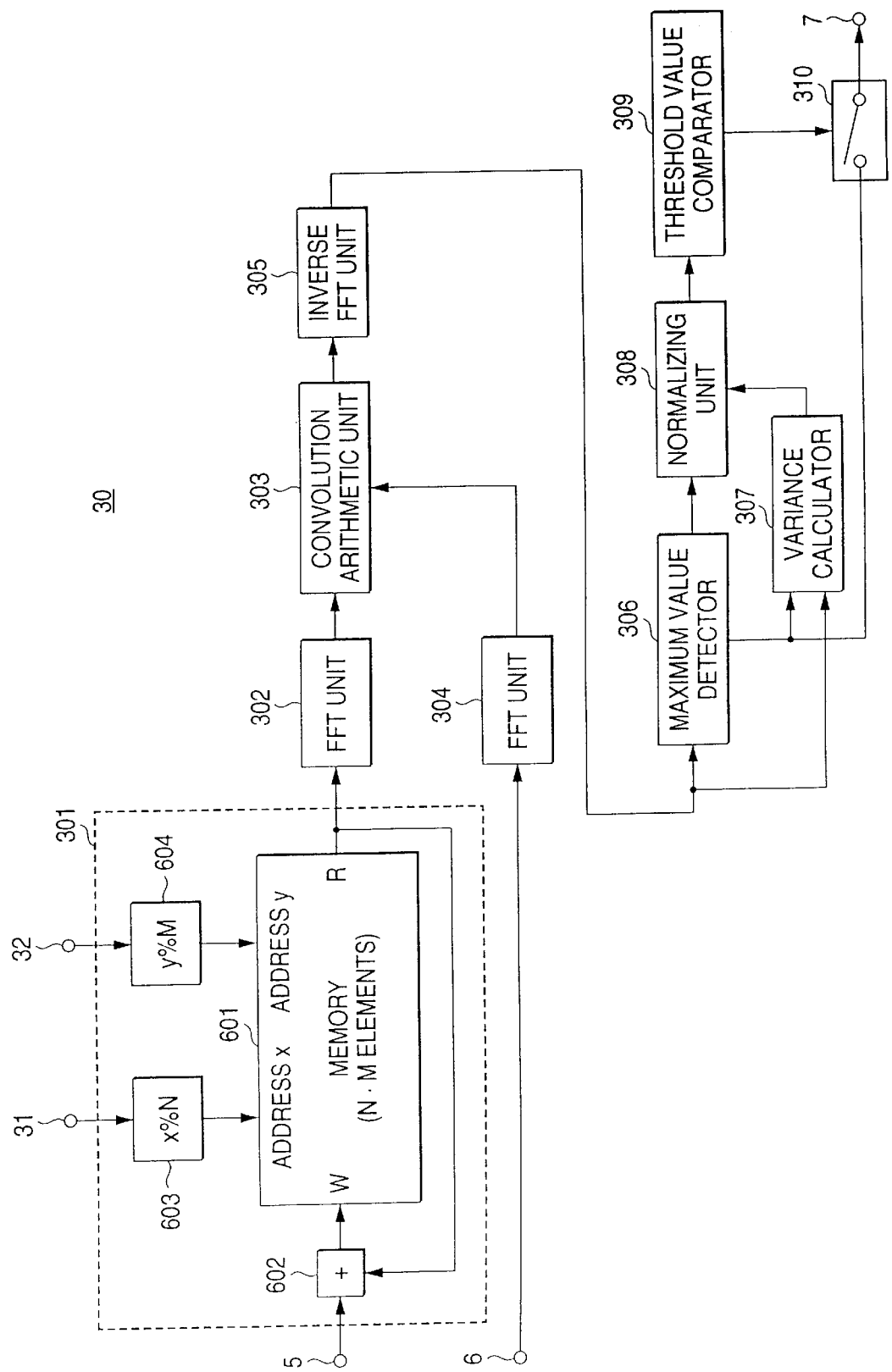
FIG. 21 is a block diagram of an associated information detecting apparatus corresponding to the associated information adding apparatus of the second embodiment.

FIG. 21 is a block diagram showing the whole structure of the watermark base band detecting apparatus 30 in this second embodiment, which is quite the same as the watermark base band detecting apparatus 30 shown in FIG. 9 except an internal structure of the part of the folding accumulator 301.

The folding accumulator 301 of FIG. 21 includes a memory 601 having a capacity for N×M elements corresponding to the size of the unit watermark wm, an accumulative adder 602, and address setting portions 603 and 604.

This folding accumulator 301 is different from the case of the unit watermark with a size of L×L in the method of obtaining a surplus when an address is specified at accumulation. In the address setting portions 603 and 604 of the folding accumulator 301 of FIG. 21, a surplus can be obtained with independent values in the horizontal direction (x direction) and the vertical direction (y direction).

That is, in the address setting portions 603 and 604, surpluses are obtained by dividing an x coordinate and a y coordinate from the x-coordinate input terminal 31 and the y-coordinate input terminal 32 by the size N of the unit watermark in the horizontal direction and the size M in the vertical direction, respectively, and they are inputted as an address x and an address y of the memory 601. By this, folding accumulation in a unit of the unit watermark wm of M×N can be made, and the watermark can be detected.

As described above, the folding accumulator 401 in the watermark bit stream detecting apparatus 40 of FIG. 14 is made the same structure as the folding accumulator 301 of FIG. 21, so that with respect to image information in which the watermark was added by the watermark adding apparatus of FIG. 20 and compression encoding was made by the MPEG encoder 20, folding accumulation at DCT coefficients in a unit of the unit watermark wm having a size of N×M becomes possible, and the watermark can be detected.

An illegal use preventing system in this second embodiment uses the watermark adding apparatus of FIG. 20, and uses the watermark base band detecting apparatus of FIG. 21 and the watermark bit stream detecting apparatus. This illegal use preventing system includes an illegal copying preventing system, and on the basis of the information of the watermark detected by the watermark detecting apparatus, this system makes control of reproduction of base band image information or bit stream image information, and makes control of use for duplicate recording.

In the illegal use preventing system of this second embodiment, since the vertical and horizontal sizes of the unit watermark are independently selected, there is such an advantage that the pattern of the watermark becomes hard to understand, and the system becomes strong against attack to the watermark.

[Third Embodiment]

A third embodiment is such that a repetitive pattern of a unit watermark in one image (one frame or one field) is not arranged as described before, but it is sequentially shifted by a constant amount in a row direction (horizontal direction) for every row made of repetition of the unit watermark in the horizontal direction, so that the watermark pattern is made hard to understand and attack to the watermark is made difficult.

Figure 22A:
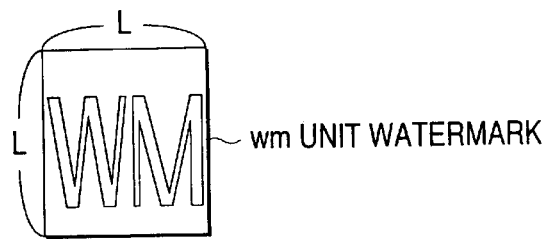
FIGS. 22A to 22C are views for explaining a third embodiment of an associated information adding apparatus of the invention.
Figure 22B:
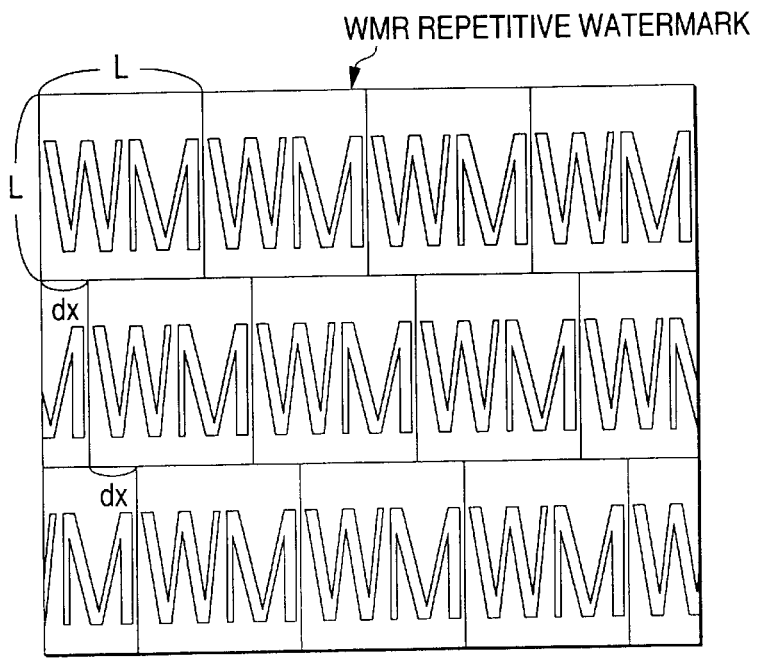
Figure 22C:
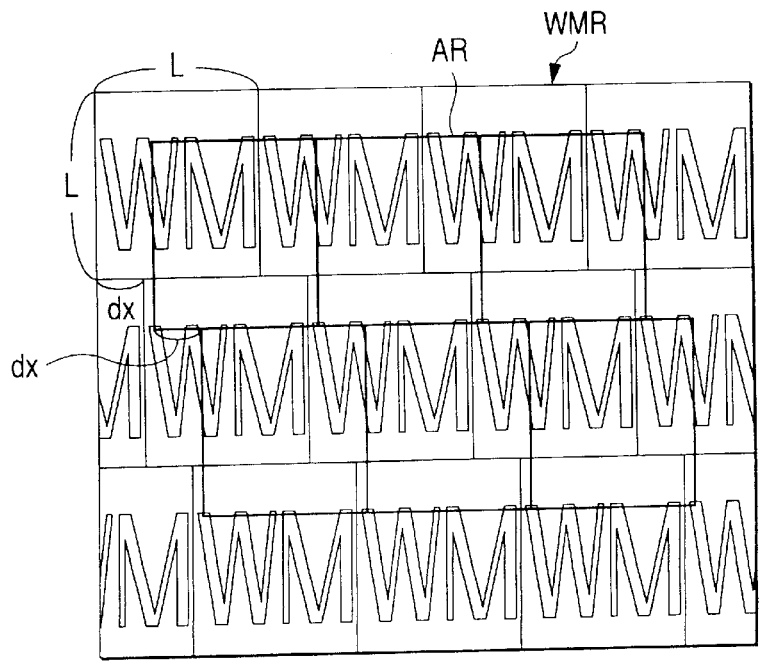

FIGS. 22A to 22C are views for explaining a repetitive watermark WMR of an example of this third embodiment. In this example, as shown in FIG. 22A, a unit watermark wm having horizontal×vertical=L×L pixels is used similarly to the first embodiment. Then, as shown in FIG. 22B, a repetitive pattern is sequentially shifted in a horizontal direction by a constant amount dx for every row where the unit watermark is repeated, so that the repetitive watermark WMR is produced. The repetitive watermark WMR of FIG. 22B is added to an image.

Also in this third embodiment, the stream of the system is expressed as shown in FIG. 5, and the watermark adding apparatus 10, the watermark base band detecting apparatus 30, and the watermark bit stream detecting apparatus 40 are main components.

As the watermark adding apparatus 10 of the third embodiment, it is also possible to design such that the whole repetitive watermark of FIG. 22B is stored in a memory, and sequential reading is performed using an x-coordinate input and a y-coordinate input from the input terminals 11 and 12 as the memory address. However, this makes memory capacity large. Thus, in an example described below, an apparatus obtained by applying the watermark adding apparatus of the first embodiment shown in FIG. 18 is used.

Figure 8C:
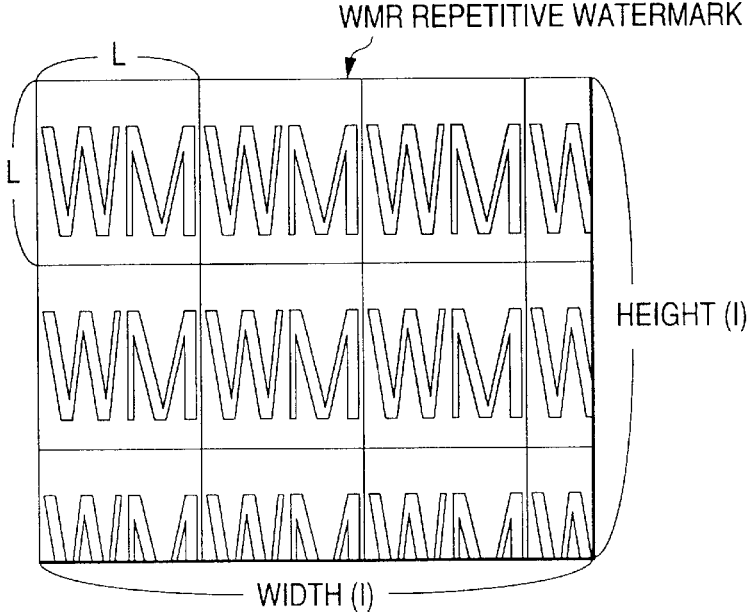

The watermark adding apparatus 10 of the third embodiment in the case of this example is different from the watermark adding apparatus of the first embodiment shown in FIG. 18 in the manner of repetition of the unit watermark wm. That is, in the repetitive watermark WMR of the watermark adding apparatus of the first embodiment, the unit watermark is simply arranged vertically and horizontally on the image as shown in FIG. 8. On the other hand, the manner of repetition of the repetitive watermark WMR of the watermark adding apparatus of the third embodiment is such that although the unit watermark is arranged in order in the horizontal direction, it is sequentially shifted in the vertical direction as shown in FIG. 22B.

Figure 23:
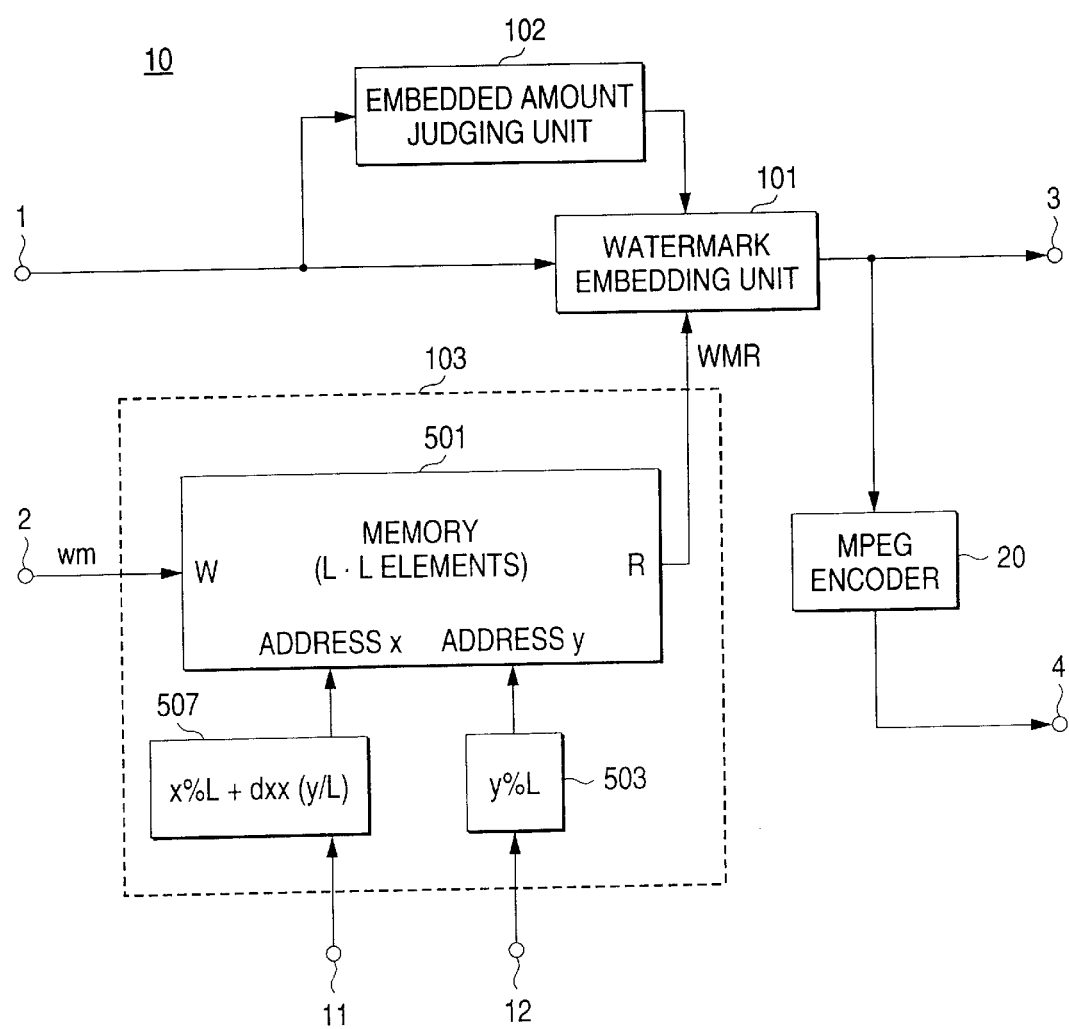
FIG. 23 is a block diagram of the third embodiment of the associated information adding apparatus of the invention.

FIG. 23 shows a structural example of the watermark adding apparatus 10 of the third embodiment of this case. The structure of the watermark adding apparatus 10 is different from the watermark adding apparatus of the first embodiment only in an inner structure of the portion of the watermark repeating unit 103.

In the watermark repeating unit 103 of FIG. 23, although a memory 501 and an address setting portion 503 for a y coordinate are quite the same as those of the first embodiment, an address setting portion for an x coordinate is different, which is an address setting portion 507. In this address setting portion 507, addressing in the horizontal direction when the unit watermark is read out is different, and taking a shift amount dx in the horizontal direction for every row into consideration, an operation of x%L+dx×(y/L) is performed, so that the address x of the memory 501 is specified. Where, the notation "/" is an operator for finding a quotient. The same applies to the following. Incidentally, writing of the unit watermark wm to the memory 501 is quite the same as the first embodiment.

In the watermark added by the watermark adding apparatus of the third embodiment, continuity in the vertical direction is disturbed as shown in FIGS. 22B and 22C. However, by similarly shifting a folding accumulation region AR, which corresponds to the unit watermark at the folding accumulation in the watermark detecting apparatus, by dx for every row as shown in FIG. 22C, it becomes possible to detect the pattern of the watermark through accumulation. The watermark detecting apparatuses 30 and 40 in the case of this third embodiment will be subsequently described.

The watermark detecting apparatus in the case of the third embodiment is different from the watermark detecting apparatus of FIG. 21 in the horizontal direction addressing in the folding accumulator, so that the watermark added by the watermark adding apparatus of FIG. 23 can be detected. Since the difference is the same between the watermark detecting apparatus 30 in the base band and the watermark detecting apparatus 40 in the bit stream, the following description will be made mainly on the detecting apparatus 30 in the base band.

The structure of the watermark base band detecting apparatus 30 in the case of this third embodiment is different from the watermark detecting apparatus of FIG. 9 (FIG. 14 in the case of detection in the bit stream) in the part of the folding accumulator 301 (folding accumulator 401 in the case of detection in the bit stream).

Figure 24:
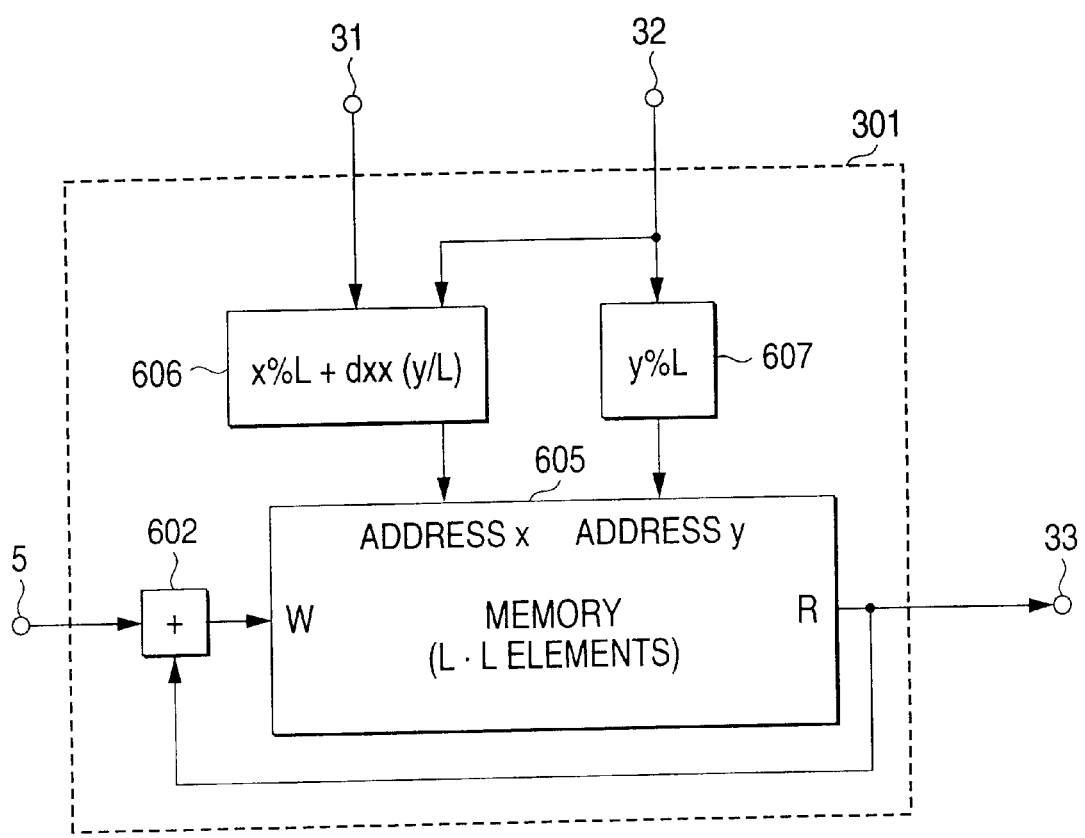
FIG. 24 is a block diagram of an associated information detecting apparatus corresponding to the associated information adding apparatus of the third embodiment.

Thus, only the part of the folding accumulator 301 of the watermark base band detecting apparatus 30 in the case of the third embodiment will be described here. FIG. 24 is a block diagram of the folding accumulator 301. This folding accumulator 301 includes a memory 605 for storing elements of the unit watermark having a size of L×L, an accumulative adder 602, and address setting portions 606 and 607.

In this folding accumulator 301, at the address setting portion 606 of the memory address x, both the x-coordinate input and the y-coordinate input from the input terminals 31 and 32 are used, and an operation of x%L+dx×(y/L) is performed, so that the address x of the memory 605 is specified. At the address setting portion 607 of the memory address y, only the y-coordinate input from the input terminal 32 is used, and an operation of y%L is performed, so that the address y of the memory 605 is specified.

In this way, in the folding accumulator 301, addressing of the memory 605 is performed, and folding accumulation is performed in the region with a unit of the unit watermark shifted by dx for every row in the same manner as in the folding accumulation region AR shown in FIG. 22C, so that it becomes possible to detect the watermark by accumulation of the watermark pattern.

An illegal use preventing system in the third embodiment uses the watermark adding apparatus of FIG. 23, and uses the watermark base band detecting apparatus of FIG. 24 and the watermark bit stream detecting apparatus. This illegal use preventing system includes an illegal copying preventing system, and on the basis of the information of the watermark detected by the watermark detecting apparatus, this system makes control of reproduction of base band image information or bit stream image information, and makes control of use for duplicate recording.

The illegal use preventing system of the third embodiment has an advantage that attack by accumulation in a frame can not be made as long as the amount of shift of the pattern of the repetitive watermark WMR in the horizontal direction is not known.

Also in the third embodiment, in the case where the repetitive unit of the unit watermark wm in the vertical direction and the horizontal direction is not equal to the vertical and horizontal size of the unit watermark wm, instead of L in the operation at the address setting portions 503 and 507 or the address setting portions 606 and 607, the size of the repetitive unit is used.

In the description of the third embodiment, although the size of the unit watermark wm is made L×L in which the vertical and horizontal sizes are equal to each other, the size of the unit watermark wm may be made M×N as in the second embodiment. In that case, the freedom as to the size of the unit watermark wm is increased, so that it is expected that the system becomes further strong against attack to the watermark.

[Fourth embodiment]

A fourth embodiment is such that a repetitive pattern of a unit watermark in one image (one frame) is not aligned as described before, but it is sequentially shifted in a column direction (vertical direction) for every column made of repetition of the unit watermark in the vertical direction, so that the watermark pattern is made hard to understand and attack to the watermark is made difficult.

Figure 25A:
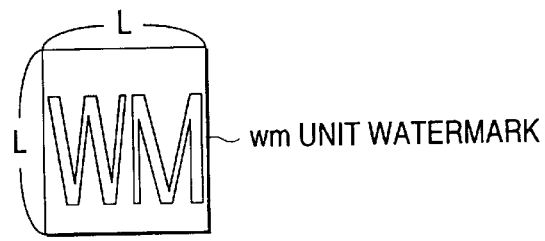
FIGS. 25A to 25C are views for explaining a fourth embodiment of an associated information adding apparatus of the invention.
Figure 25B:
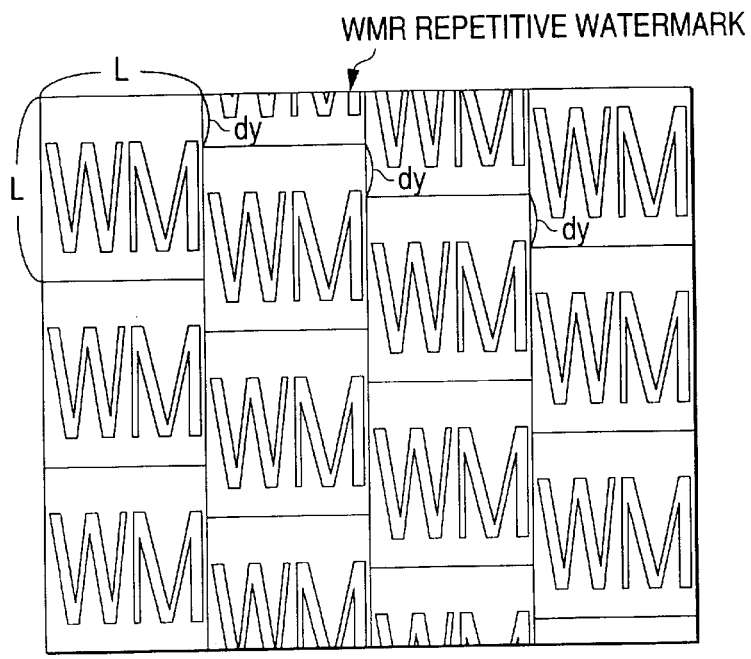
Figure 25C:
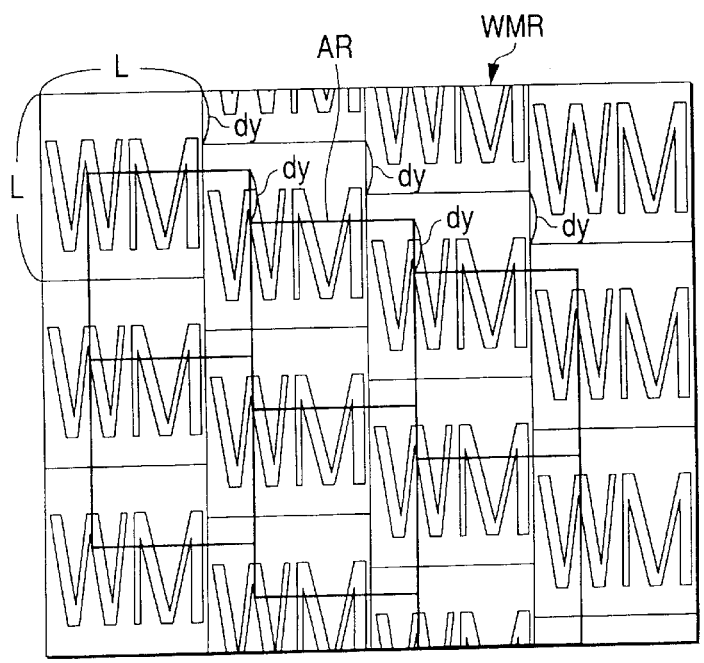

FIGS. 25A to 25C are views for explaining a repetitive watermark WMR of an example of the fourth embodiment. That is, in this example, a unit watermark wm having a size of horizontal×vertical=L×L pixels is used as shown in FIG. 25A. Then, as shown in FIG. 25B, the repetitive pattern is sequentially shifted in the vertical direction by a constant amount dy for every column where the unit watermark is repeated, so that the repetitive watermark WMR is produced. The repetitive watermark WMR of FIG. 25B is added to an image.

Also in this fourth embodiment, the stream of the system is expressed as shown in FIG. 5, and the watermark adding apparatus 10, the watermark base band detecting apparatus 30, and the watermark bit stream detecting apparatus 40 are main components.

As the watermark adding apparatus 10 of the fourth embodiment, it is also possible to design such that the whole repetitive watermark of FIG. 25B is stored in a memory, and sequential reading is performed using an x-coordinate input and a y-coordinate input from the input terminals 11 and 12 as the memory address. However, this makes memory capacity large. Thus, in an example described below, an apparatus obtained by applying the watermark adding apparatus of the first embodiment shown in FIG. 18 is used.

The watermark adding apparatus 10 of the fourth embodiment in the case of this example is different from the watermark adding apparatus of the first embodiment shown in FIG. 18 in the manner of repetition of the unit watermark wm. That is, in the repetitive watermark WMR of the watermark adding apparatus of the first embodiment, the unit watermark is simply arranged vertically and horizontally on the image as shown in FIG. 8. On the other hand, the manner of repetition of the repetitive watermark WMR of the watermark adding apparatus of the fourth embodiment is such that although the unit watermark is arranged in order in the vertical direction, it is sequentially shifted in the horizontal direction as shown in FIG. 25B.

FIG. 26 shows a structural example of the watermark adding apparatus 10 of the fourth embodiment of this case. The structure of the watermark adding apparatus 10 is different from the watermark adding apparatus of the first embodiment only in an inner structure of the portion of the watermark repeating unit 103.

In the watermark repeating unit 103 of FIG. 26, although a memory 501 and an address setting portion 502 for an x coordinate are quite the same as those of the first embodiment, an address setting portion for a y coordinate is different, which is an address setting portion 508. In this address setting portion 508, addressing in the vertical direction when the unit watermark is read out is different, and taking a shift amount dy in the vertical direction for every column into consideration, an operation of y%L+dy×(x/L) is performed, so that the address y of the memory 501 is specified. Incidentally, writing of the unit watermark wm to the memory 501 is quite the same as the first embodiment.

In the watermark added by the watermark adding apparatus of the fourth embodiment, continuity in the vertical direction is disturbed as shown in FIGS. 25B and 25C. However, by similarly shifting a region corresponding to the unit watermark at the folding accumulation in the watermark detecting apparatus, like the region AR shown in FIG. 25C, by dy for every column, it becomes possible to detect the pattern of the watermark through accumulation. The watermark detecting apparatuses 30 and 40 in the case of this fourth embodiment will be subsequently described.

The watermark detecting apparatus in the case of the fourth embodiment is different from the watermark detecting apparatus of FIG. 21 in the vertical direction addressing in the folding accumulator, so that the watermark added by the watermark adding apparatus of FIG. 26 can be detected. Since the difference is the same between the watermark detecting apparatus 30 in the base band and the watermark detecting apparatus 40 in the bit stream, the following description will be made mainly on the detecting apparatus 30 in the base band.

The structure of the watermark base band detecting apparatus 30 in the case of this fourth embodiment is different from the watermark detecting apparatus of FIG. 9 (FIG. 14 in the case of detection in the bit stream) only in the part of the folding accumulator 301 (folding accumulator 401 in the case of detection in the bit stream).

Figure 27:
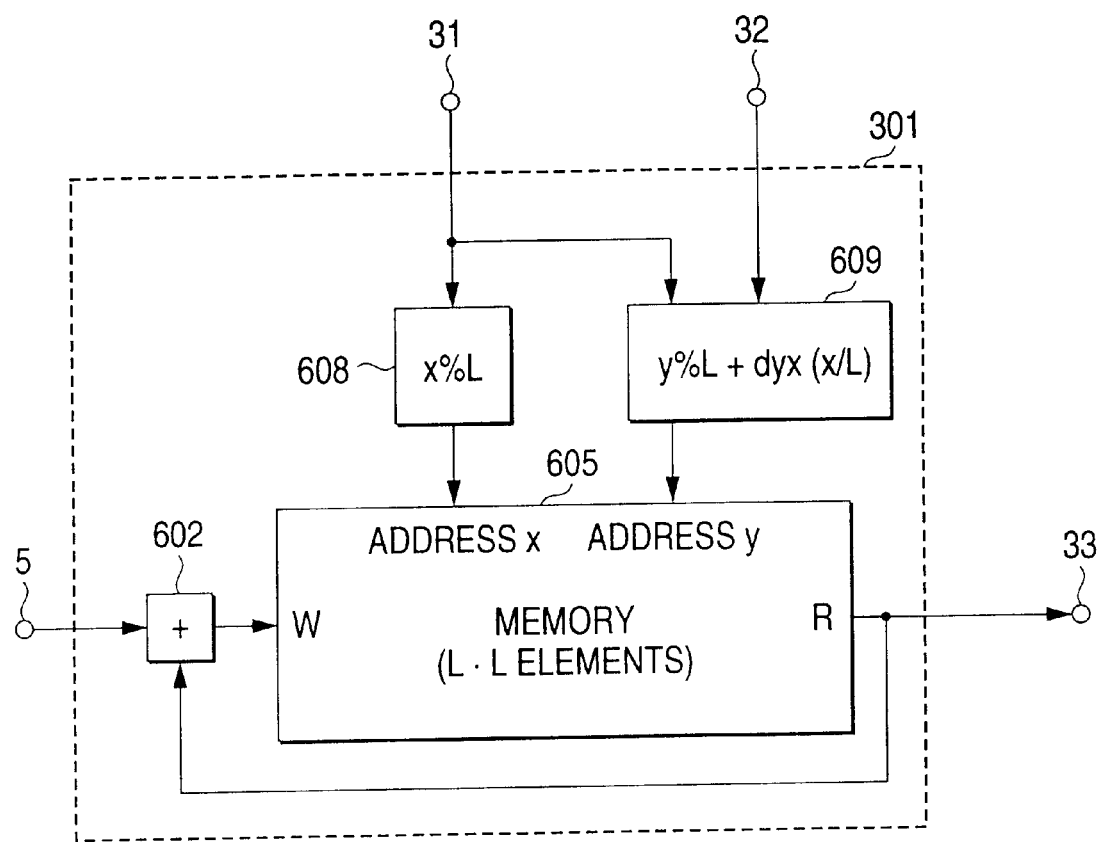
FIG. 27 is a block diagram of an associated information detecting apparatus corresponding to the associated information adding apparatus of the fourth embodiment.

Thus, only the part of the folding accumulator 301 of the watermark base band detecting apparatus 30 in the case of the fourth embodiment will be described here. FIG. 27 is a block diagram of the folding accumulator 301. This folding accumulator 301 includes a memory 605 for storing elements of the unit watermark having a size of L×L, an accumulative adder 602, and address setting portions 608 and 609.

In this folding accumulator 301, at the address setting portion 608 of the memory address x, only the x-coordinate input from the input terminal 31 is used, and an operation of x%L is performed, so that the address x of the memory 605 is specified. At the address setting portion 609 of the memory address y, both the x-coordinate input and the y-coordinate input from the input terminals 31 and 32 are used, and an operation of y%L+dy×(x/L) is performed, so that the address y of the memory 605 is specified.

In this way, in the folding accumulator 301, addressing of the memory 605 is performed, and folding accumulation is performed in the region unit of the unit watermark shifted by dy for every column in the same manner, like the region AR shown in FIG. 25C, so that it becomes possible to detect the watermark by accumulation of the watermark pattern.

An illegal use preventing system in the fourth embodiment uses the watermark adding apparatus of FIG. 26, and uses the watermark base band detecting apparatus of FIG. 27 and the watermark bit stream detecting apparatus. This illegal use preventing system includes an illegal copying preventing system, and on the basis of the information of the watermark detected by the watermark detecting apparatus, this system makes control of reproduction of base band image information or bit stream image information, and makes control of use for duplicate recording.

The illegal use preventing system of the fourth embodiment has an advantage that attack by accumulation in a frame can not be made as long as the amount of shift of the pattern of the repetitive watermark WMR in the vertical direction is not known.

Also in the fourth embodiment, in the case where the repetitive unit of the unit watermark wm in the vertical direction and the horizontal direction is not equal to the vertical and horizontal size of the unit watermark wm, instead of L in the operation at the address setting portions 502 and 508 or the address setting portions 608 and 609, the size of the repetitive unit is used.

In the description of the fourth embodiment, although the size of the unit watermark wm is made L×L in which the vertical and horizontal sizes are equal to each other, the size of the unit watermark wm may be made M×N as in the second embodiment. In that case, the freedom as to the size of the unit watermark wm is increased, so that it is expected that the system becomes further strong against attack to the watermark.

[Fifth embodiment]

In a fifth embodiment, a repetitive watermark WMR sequentially shifted in a time direction in a unit of one image (one frame or one field) is added to an image information and is detected, so that the watermark pattern is made hard to understand and attack to the watermark is made difficult.

Figure 28A:
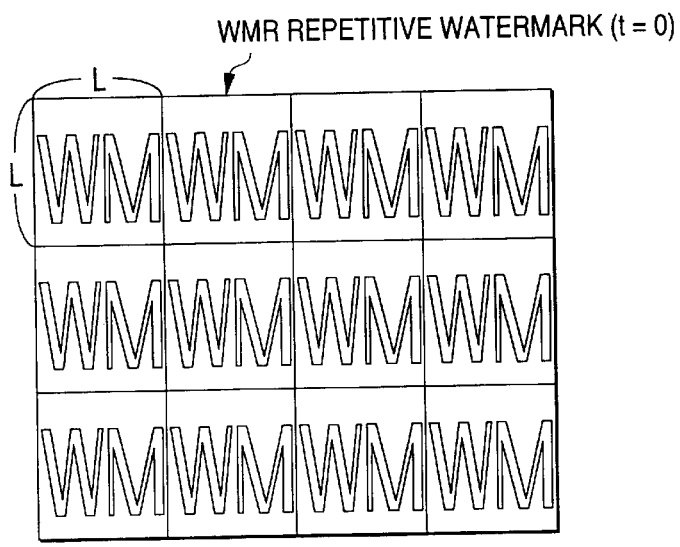
FIGS. 28A to 28C are views for explaining a fifth embodiment of an associated information adding apparatus of the invention.
Figure 28B:
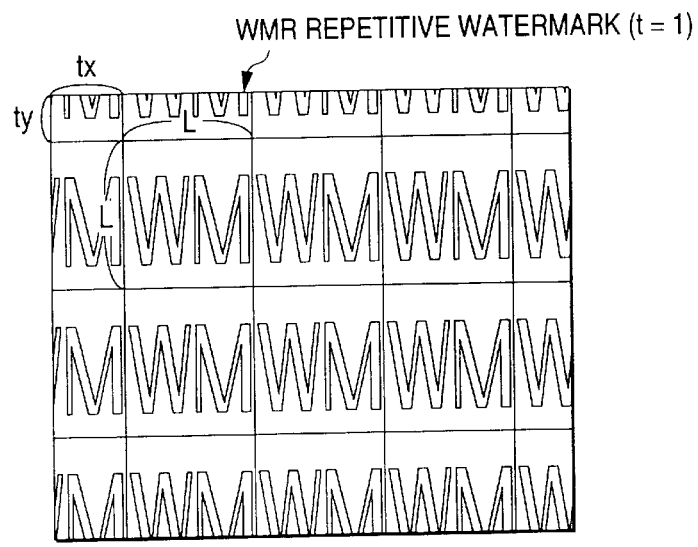
Figure 28C:
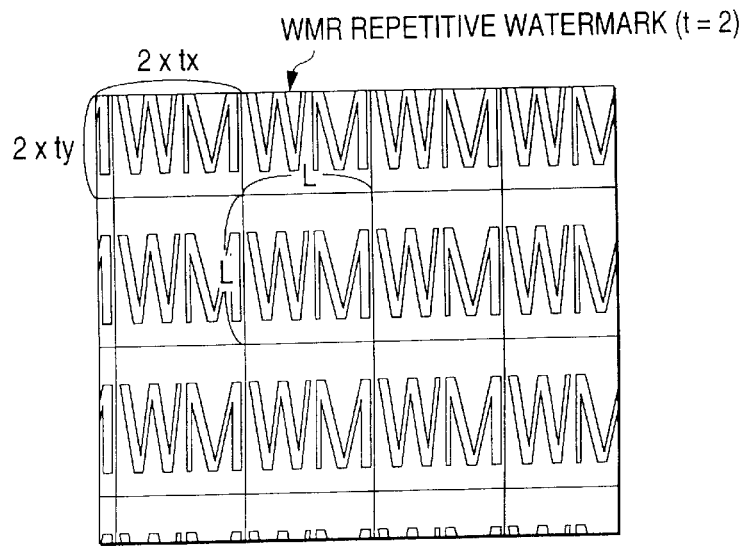

FIGS. 28A to 28C are views for explaining an example of the fifth embodiment. That is, in this example, a unit watermark wm having a size of horizontal×vertical=L×L pixels is used as shown in FIG. 28A, and a repetitive watermark WMR in which the unit watermark wm is arranged and repeated in the vertical direction and the horizontal direction is obtained. However, as shown in FIGS. 28A to 28C, the repetitive watermark WMR is sequentially shifted by tx in the horizontal direction and by ty in the vertical direction for every constant time and is added to an image.

Figure 1:
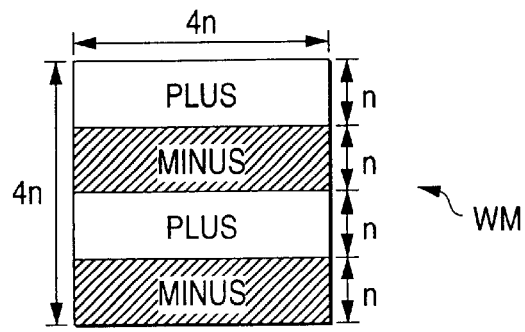
FIG. 1 is a view for explaining a watermark to be embedded in an image.
Figure 2:
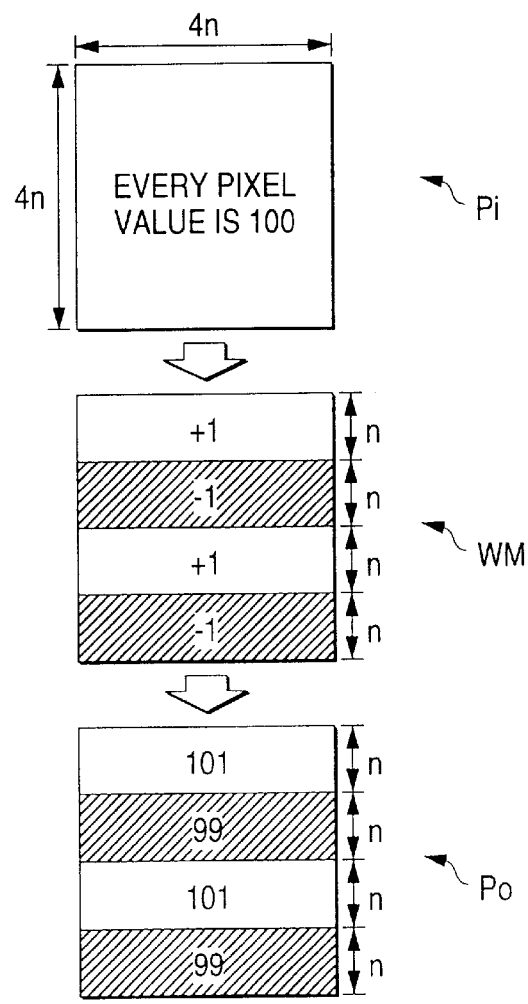
FIG. 2 is a view for explaining a watermark to be embedded in an image.
Figure 3:
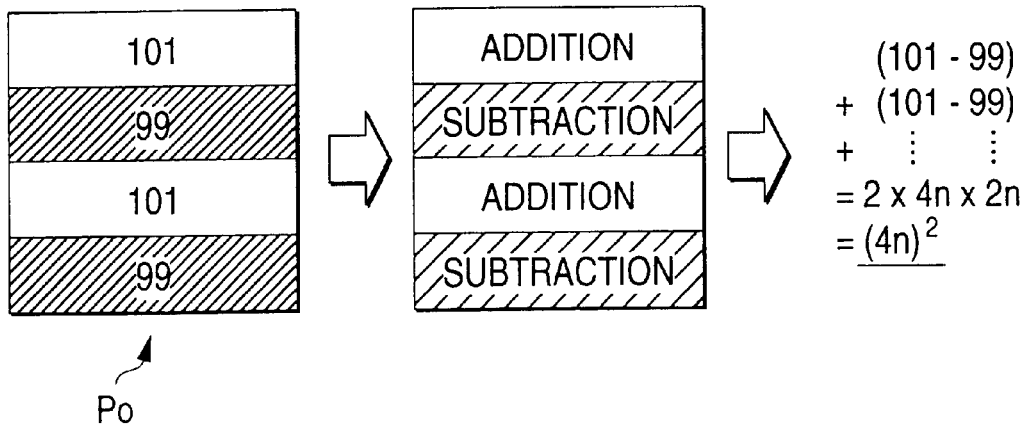
FIG. 3 is a view for explaining a watermark to be embedded in an image.
Figure 4:
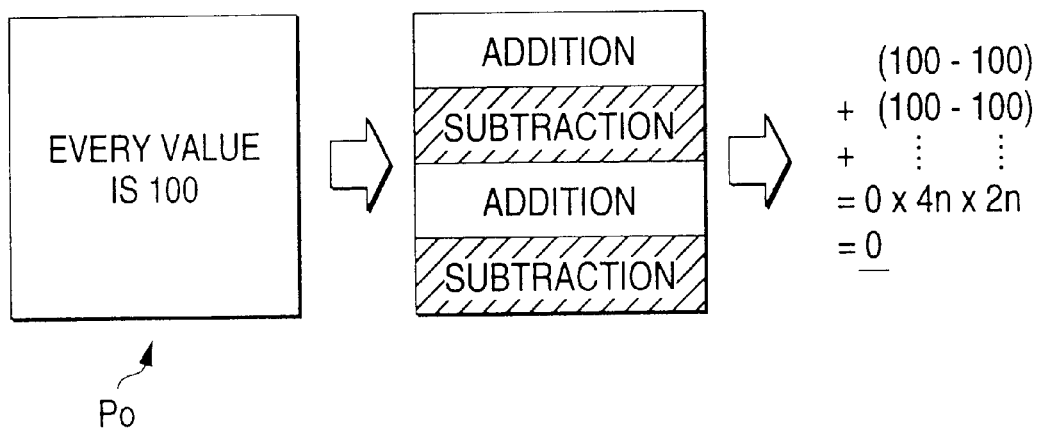
FIG. 4 is a view for explaining a watermark to be embedded in an image.

FIGS. 28A to 28C show an example in which the repetitive watermark is sequentially shifted for every frame by tx in the horizontal direction and ty in the vertical direction. That is, the shift amount of the repetitive watermark WMR relative to the image is zero at the point of time t=0 shown in FIG. 28A, a constant amount tx in the horizontal direction and a constant amount ty in the vertical direction at the point of time t=1 shown in FIG. 28B, and 2tx in the horizontal direction and 2ty in the vertical direction at the point of time t=2 shown in FIG. 28C. At time t=n, the shift amount is n·tx in the horizontal direction and n·ty in the vertical direction.

Also in this fifth embodiment, the stream of the system is expressed as shown in FIG. 5, and the watermark adding apparatus 10, the watermark base band detecting apparatus 30, and the watermark bit stream detecting apparatus 40 are main components.

Also in this fifth embodiment, as a watermark adding apparatus, an apparatus obtained by applying the watermark adding apparatus of the first embodiment shown in FIG. 18 is used so as to decrease memory capacity.

The watermark adding apparatus 10 of the fifth embodiment is different from the watermark adding apparatus of the first embodiment shown in FIG. 18 in the manner of repetition of the unit watermark wm. That is, although the repetitive watermark pattern WMR in the watermark adding apparatus of the first embodiment is not changed with time, the repetitive watermark pattern WMR produced by the watermark adding apparatus of the fifth embodiment is sequentially shifted with time as shown in FIGS. 28A to 28C.

Figure 29:
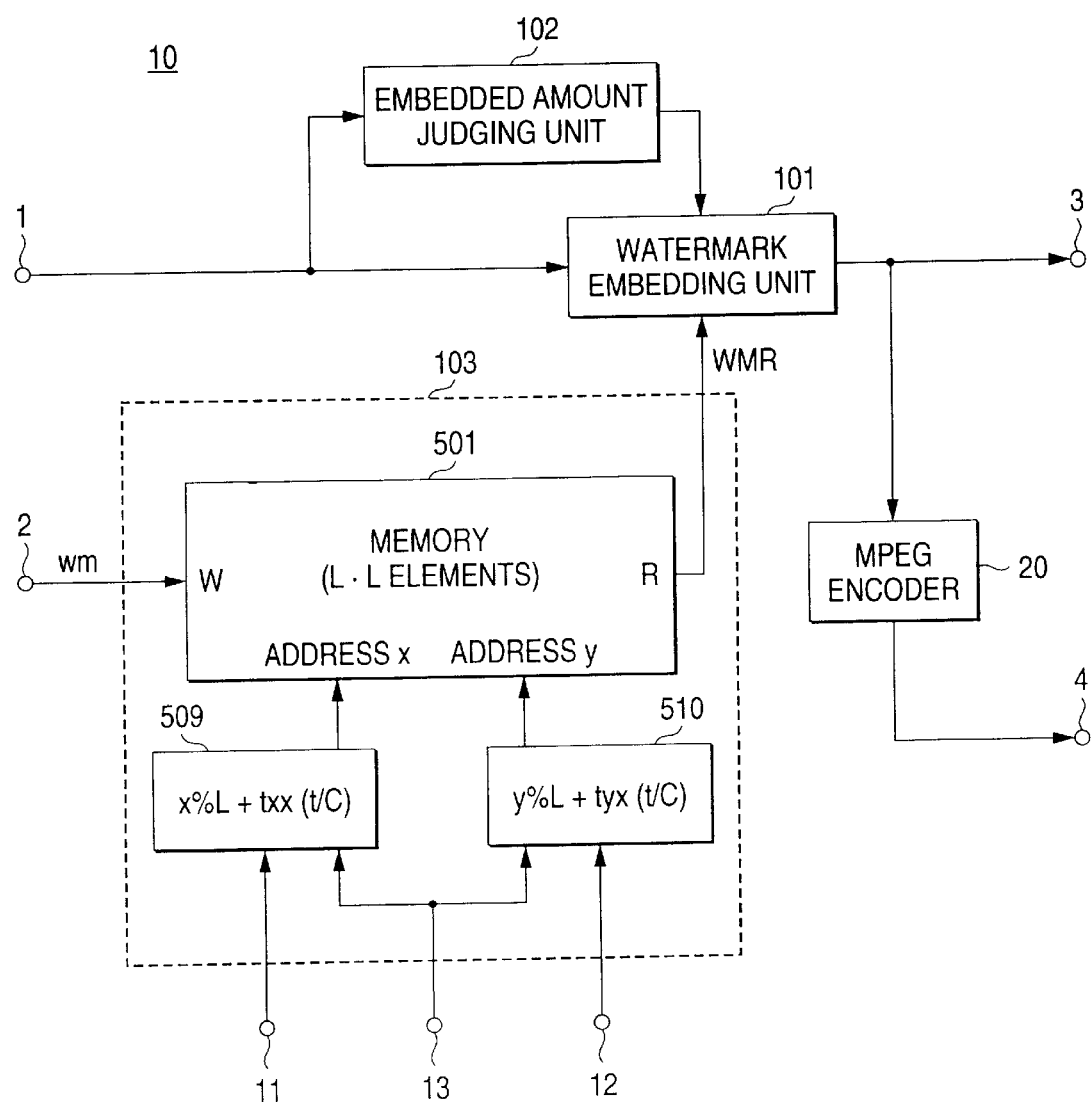
FIG. 29 is a block diagram of the fifth embodiment of the associated information adding apparatus of the invention.

FIG. 29 shows a structural example of the watermark adding apparatus 10 of the fifth embodiment of this case. The structure of the watermark adding apparatus 10 is different from the watermark adding apparatus of the first embodiment only in an inner structure of the portion of the watermark repeating unit 103.

Although the watermark repeating unit of FIG. 29 is the same as the watermark repeating unit of the first embodiment of FIG. 18 in the use of the memory 501 and writing of the unit watermark wm to the memory 501, addressing in both the vertical direction and the horizontal direction when the unit watermark wm is read out is different.

That is, address setting portions 509 and 510 use three parameters of coordinate x, coordinate y, and time t when the unit watermark wm is read out, and the address setting portion 509 performs an operation of x%L+tx×(t/C), and specifies the address x of the memory 501. The address setting portion 510 performs an operation of y%L+ty×(t/C), and specifies the address y of the memory 501. Here, C is an arbitrary constant (C is an integer not less than 1) for determining a time period for shift of the repetitive watermark WMR, and for example, it may be a frame number or a field number.

The watermark added by the watermark adding apparatus of the fifth embodiment does not have the same pattern in the time direction as sequentially shown in FIGS. 28A, 28B and 28C, but is shifted in a constant direction. However, by similarly shifting a region of folding accumulation at the time of folding accumulation, it becomes possible to detect the watermark pattern through accumulation. The watermark detecting apparatuses 30 and 40 of the fifth embodiment will be subsequently described.

The watermark detecting apparatus in the case of the fifth embodiment is different from the watermark detecting apparatus of FIG. 21 in the vertical direction addressing in the folding accumulator, so that the watermark added by the watermark adding apparatus of FIG. 26 can be detected.

Since the difference is the same between the watermark detecting apparatus 30 in the base band and the watermark detecting apparatus 40 in the bit stream, the following description will be made mainly on the detecting apparatus 30 in the base band.

The structure of the watermark base band detecting apparatus 30 in the case of this fifth embodiment is different from the watermark detecting apparatus of FIG. 9 (FIG. 14 in the case of detection in the bit stream) only in the part of the folding accumulator 301 (folding accumulator 401 in the case of detection in the bit stream).

Figure 30:
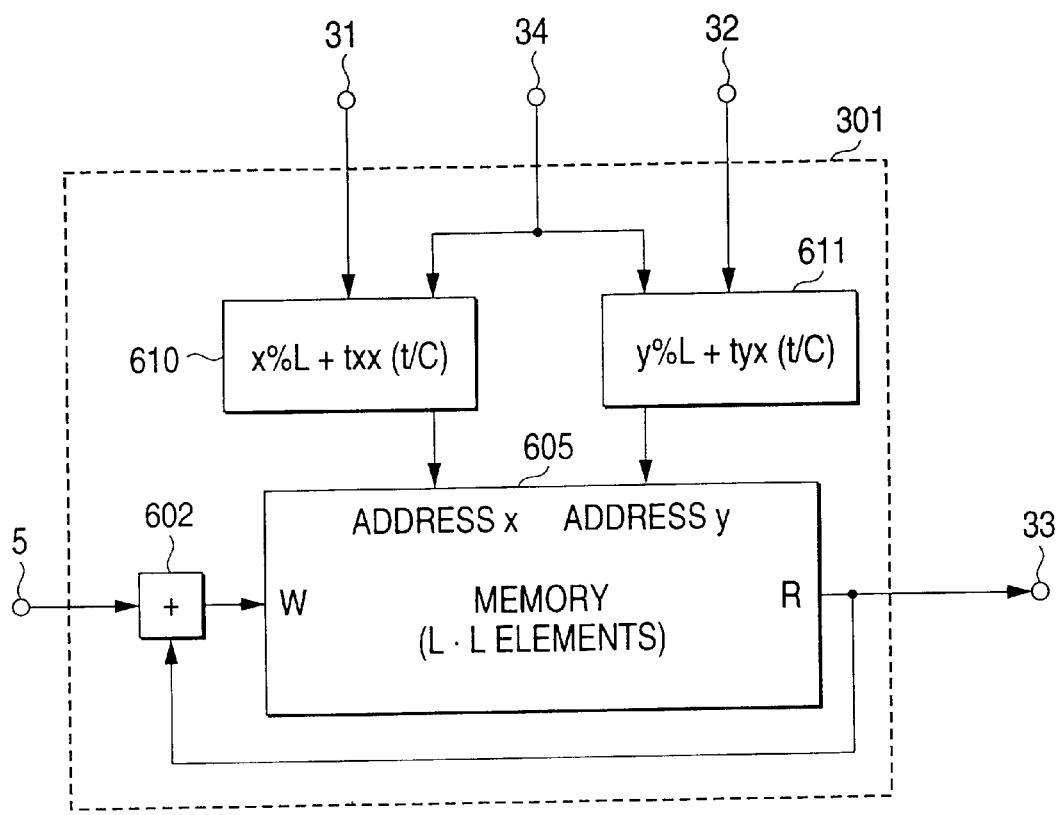
FIG. 30 is a block diagram of an associated information detecting apparatus corresponding to the associated information adding apparatus of the fifth embodiment.

Thus, only the part of the folding accumulator 301 of the watermark base band detecting apparatus 30 in the case of the fifth embodiment will be described here. FIG. 30 is a block diagram of the folding accumulator 301. This folding accumulator 301 includes a memory 605 for storing elements of the unit watermark having a size of L×L, an accumulative adder 602, and address setting portions 610 and 611.

In this folding accumulator 301, at the address setting portion 610 of the memory address x, the x-coordinate input from the input terminal 31 and the information of time t from the input terminal 34 are used, and an operation of x%L+tx×(t/C) is performed, so that the address x of the memory 605 is specified. At the address setting portion 611 of the memory address y, the y-coordinate input from the input terminal 32 and the information of time t from the input terminal 34 are used, and an operation of y%L+ty×(t/C) is performed, so that the address y of the memory 605 is specified.

In this way, in the folding accumulator 301, addressing of the memory 605 is performed, and folding accumulation is performed in the region unit of the unit watermark shifted by a constant amount vertically and horizontally for every constant time, so that it becomes possible to detect the watermark through accumulation of the watermark pattern.

An illegal use preventing system in the fifth embodiment uses the watermark adding apparatus of FIG. 29, and uses the watermark base band detecting apparatus of FIG. 30 and the watermark bit stream detecting apparatus. This illegal use preventing system includes an illegal copying preventing system, and on the basis of the information of the watermark detected by the watermark detecting apparatus, this system makes control of reproduction of base band image information or bit stream image information, and makes control of use for duplicate recording.

The illegal use preventing system of the fifth embodiment has an advantage that attack through accumulation between frames can not be made as long as the amount of shift of the repetitive watermark WMR in the time direction is not known.

Here, when the value of the constant C is made 1, the repetitive watermark pattern WMR added for every frame is changed. The value of the constant C=1 is suitable for the case where detection is made for the base band. When the value of the constant C is made 15, the repetitive watermark pattern WMR is changed for every 15 frames. This value of the constant C is suitable for the case where detection is made from the bit stream in which the number of GOP (Group Of Picture) in MPEG compression encoding is 15.

When the fifth embodiment is combined with the method of the second to fourth embodiments and is used, this becomes further strong against attack. For example, in the case where the methods of the second embodiment, the third embodiment, and the fifth embodiment are combined and are used, it is possible to realize an illegal use preventing system by the watermark adding apparatus using the watermark repeating unit of FIG. 31 and the watermark detecting apparatus using the folding accumulator of FIG. 32.

Figure 31:
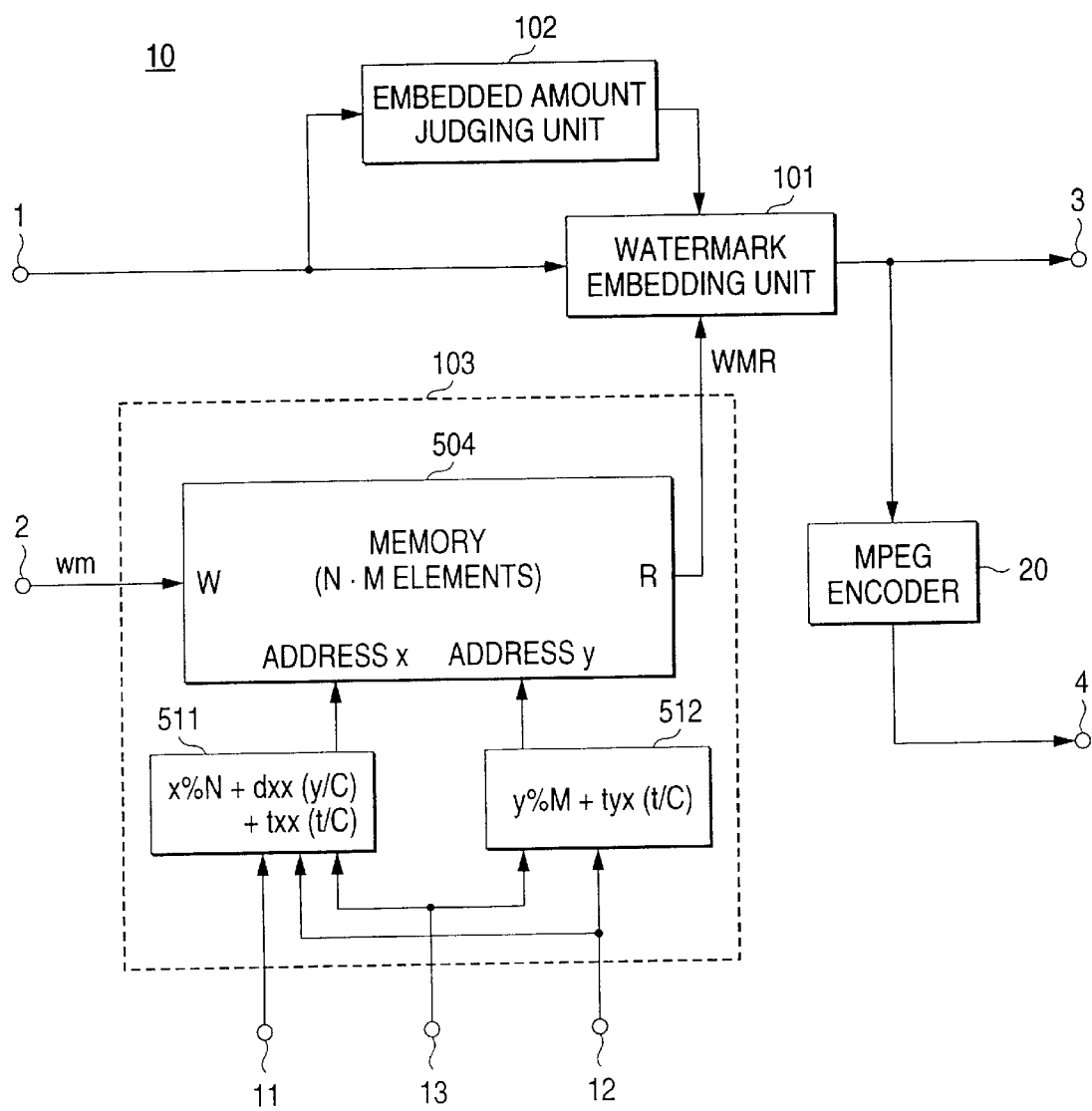
FIG. 31 is a block diagram of another example of the fifth embodiment of the associated information adding apparatus of the invention.

The watermark repeating unit of FIG. 31 uses the memory 504 capable of storing N×M elements and the address setting portions 511 and 512. Although writing of the unit watermark wm into the memory is the same as the case of the second embodiment, addressing in both the vertical and horizontal directions when the unit watermark wm is read out from the memory 504 is different.

That is, when the unit watermark wm is read out, the address setting portion 511 uses three parameters of coordinate x, coordinate y, and time t from the input terminals 11, 12, and 13 to perform an operation of x%N+dx×(y/C)+tx×(t/C), and specifies the address x of the memory 504. The address setting portion 512 performs an operation of y%M+ty×(t/C) and specifies the address y of the memory 504.

Figure 32:
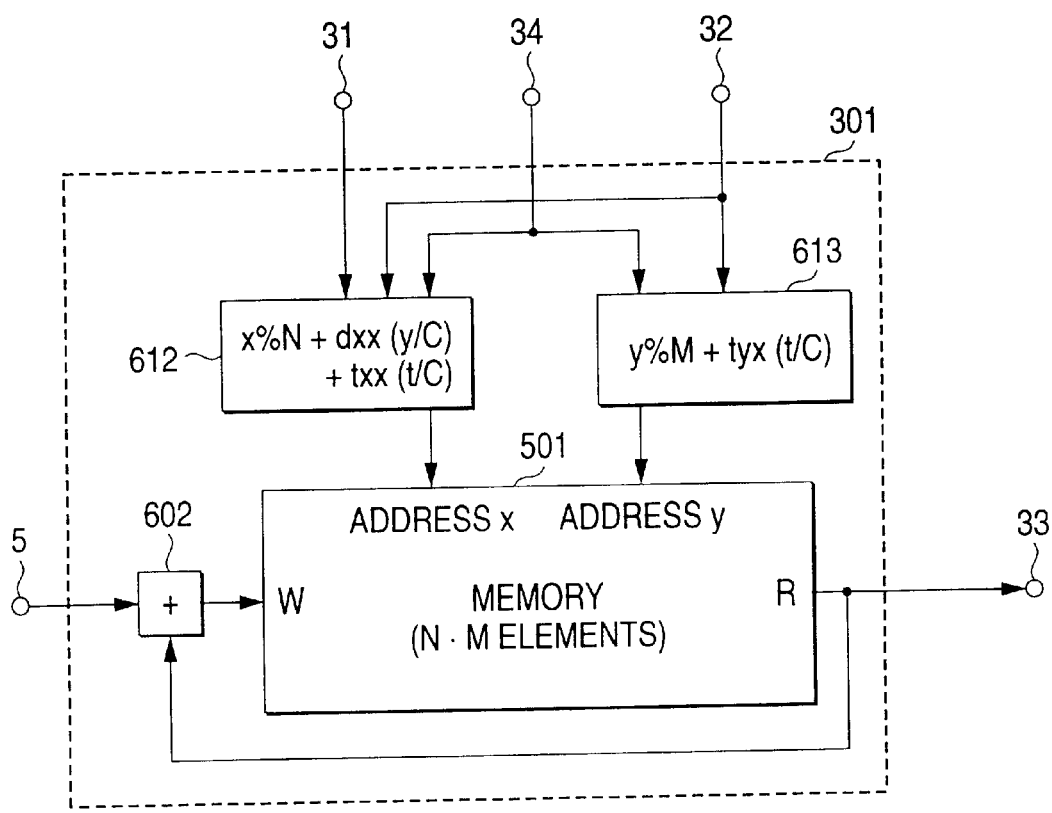
FIG. 32 is a block diagram of an associated information detecting apparatus corresponding to the associated information adding apparatus of the fifth embodiment of FIG. 31.

The folding accumulator 301 of FIG. 32 uses the memory 601 capable of storing N*M elements and the address setting portions 612 and 613. The address setting portion 612 of the memory address x uses the x-coordinate input from the input terminal 31, the y-coordinate input from the input terminal 32, and the information of time t from the input terminal 34 to perform an operation of x%N+dx*(y/C)+tx*(t/C), and specifies the address x of the memory 601. The address setting portion 613 of the memory address y uses the y-coordinate input from the input terminal 31 and the information of time t from the input terminal 34 to perform an operation of y%M+ty*(t/C), and specifies the address y of the memory 601.

This system has an advantage that as long as the vertical and horizontal sizes of the unit watermark, the shift amount in the horizontal direction in the frame, and the shift amount in the vertical and horizontal directions between frames are not known, it is impossible to make attack through accumulation in the frame and between the frames. With respect to addition of the watermark and the detecting apparatus, only the way of access to the memory is changed, and they are realized without complicating the apparatus.

Incidentally, in the foregoing fifth embodiment, although the whole pattern of the repetitive watermark WMR is shifted in both the vertical and horizontal directions for every constant time C, it may be shifted only in the vertical direction or horizontal direction for every constant time C.

Also in the fifth embodiment, in the case where the repetition unit of the unit watermark wm in the vertical direction and the horizontal direction is not equal to the vertical and horizontal size of the unit watermark wm, instead of L, N, and M in the operations at the address setting portions 509, 510, 511 and 512 or the address setting portions 610, 611, 612 and 613, the size of the repetition unit is used.

Incidentally, in the respective watermark detecting apparatuses of the second to fifth embodiments, the input from the input terminal 6 is changed from the unit watermark wm to what is obtained by subjecting the unit watermark wm to FFT, so that the FFT unit 304 for the unit watermark wm may be omitted.

As described above, in the associated information adding apparatus of the invention, it is not necessary to repeat a unit watermark in a memory, but it is sufficient if the memory stores only the unit watermark, so that the memory to be used may be small.

Moreover, in the associated information adding apparatus of the invention, since the freedom with respect to the vertical and horizontal sizes of a unit watermark increases as compared with the prior art, attack against the watermark becomes difficult.

Further, there is also such an effect that the freedom can be realized by slightly changing a watermark adding apparatus and a watermark detecting apparatus and without complicating the apparatuses.

What is claimed is:

1. An associated information adding apparatus for adding, to an image, a repetitive watermark in which a unit watermark having a size corresponding to a small region made of pixels of a part of the image is repeated vertically and horizontally, comprising:

repeating means for producing said repetitive watermark, including a memory capable of storing said unit watermark and for repeatedly producing said unit watermark from said memory on the basis of a pixel position coordinate value of said image; said repeating means shifting said unit watermark by an amount calculated by multiplying a vertical shift value and a horizontal shift value by a time value corresponding to a unit of said image; said repeating means further shifting said unit watermark by a constant horizontal amount for every row where said unit watermark is repeatedly arranged in said horizontal direction and by a constant vertical amount for every column where said unit watermark is repeatedly arranged in said vertical direction; said repeating means producing portions of said unit watermark corresponding to areas of said image without watermarks due to shifting said unit watermark; and adding means for adding said repetitive watermark produced by said repeating means to information of said image so that said unit watermark is vertically and horizontally repeated on said image, whereby the entirety of said image is covered by unit watermarks in said repetitive watermark.

2. An associated information adding apparatus according to claim 1, wherein said repeating means repeatedly reads out said unit watermark from said memory means by using a surplus obtained by dividing the pixel position coordinate value of said image in a vertical direction and a horizontal direction by a vertical and horizontal size of said unit watermark.

3. An associated information adding apparatus according to claim 1, wherein the size of said unit watermark corresponds to said small region made of N×M (N and M respectively a positive integer) pixels.

4. An associated information adding apparatus according to claim 1, wherein said image is compression encoded in a unit of a block, and said size of said unit watermark is an integral number of times as large as said compression encoded block.

5. An associated information detecting apparatus for detecting associated information by detecting a unit watermark from an image added with a repetitive watermark in which said unit watermark having a size corresponding to a small region made of pixels of a part of said image is repeated vertically and horizontally and shifted by an amount calculated by multiplying a vertical shift value and a horizontal shift value by a time value corresponding to a unit of said image, by a constant horizontal amount for every row where said unit watermark is repeatedly arranged in said horizontal direction, by a constant vertical amount for every column where said unit watermark is repeatedly arranged in said vertical direction, and wherein portions of said unit watermark are wrapped around the edges of said repetitive watermark corresponding to areas without complete unit watermarks due to shifting, whereby the entirety of said image is covered by unit watermarks in said repetitive watermark; the associated information detecting apparatus comprising:

means for performing folding accumulation to said image added with said repetitive watermark in a unit of said small region in view of a shift of said amount for every unit of said image, a shift of said constant horizontal amount for every row, and a shift of said constant vertical amount for every column;

correlation judging means for examining correlation between an accumulation result and said unit watermark; and means for obtaining a detection output as to said unit watermark on the basis of an output of said correlation judging means.

6. An associated information detecting apparatus according to claim 5 wherein the size of said unit watermark corresponds to said small region made of N×M (N and M respectively a positive integer) pixels.

* * * * *